United States Patent
Lei et al.

(10) Patent No.: US 11,678,333 B2
(45) Date of Patent: Jun. 13, 2023

(54) METHODS AND APPARATUS FOR BANDWIDTH PART ENHANCEMENT

(71) Applicant: QUALCOMM Incorporated, San Diego, CA (US)

(72) Inventors: Jing Lei, San Diego, CA (US); Jing Sun, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 16/121,228

(22) Filed: Sep. 4, 2018

(65) Prior Publication Data

US 2019/0141734 A1 May 9, 2019

Related U.S. Application Data

(60) Provisional application No. 62/581,199, filed on Nov. 3, 2017.

(51) Int. Cl.
*H04W 72/12* (2023.01)
*H04W 72/04* (2023.01)
(Continued)

(52) U.S. Cl.
CPC ........... *H04W 72/23* (2023.01); *H04L 5/0098* (2013.01); *H04W 72/0453* (2013.01);
(Continued)

(58) Field of Classification Search
CPC ... H04L 5/0007; H04L 5/0044; H04L 5/0053; H04L 5/0098; H04W 72/0453; H04W 72/1289
See application file for complete search history.

(56) References Cited

U.S. PATENT DOCUMENTS 9,826,523 B2  11/2017  Chen et al.
10,136,452 B2  11/2018  Liu et al.
(Continued)

FOREIGN PATENT DOCUMENTS

CN  1833460 A  9/2006
CN  101128028 A  2/2008
(Continued)

OTHER PUBLICATIONS

International Search Report and Written Opinion—PCT/US2018/049490—ISA/EPO—dated Jan. 4, 2019.
(Continued)

*Primary Examiner* — Derrick V Rose
(74) *Attorney, Agent, or Firm* — Norton Rose Fulbright LLP

(57) ABSTRACT

Enhancement for bandwidth part (BWP) is disclosed. A base station configures a plurality of BWPs, and activate multiple BWPs for downlink and multiple BWPs for uplink from the plurality of the configured BWPs at a given time. Downlink control information (DCI) that includes BWP activation information can be transmitted on a physical downlink control channel (PDCCH) to a user equipment (UE). The BWP activation information includes a link direction, a schedule of the one or more multiple BWPs for downlink and multiple BWPs for uplink, numerologies, reserved sub-band information, tracking reference signal configuration, or any combination thereof. Correspondingly, a UE receives DCI on a PDCCH that includes BWP activation information, and determines activation of multiple BWPs for downlink and multiple BWPs for uplink at a given time based on the received DCI and its capabilities. Associated enhancement for PDCCH and PDSCH scheduling and LBT procedures are also disclosed.

28 Claims, 16 Drawing Sheets

(51) Int. Cl.
  *H04W 72/23* (2023.01)
  *H04L 5/00* (2006.01)
  *H04W 72/0453* (2023.01)

(52) U.S. Cl.
  CPC .......... *H04L 5/0007* (2013.01); *H04L 5/0044* (2013.01); *H04L 5/0053* (2013.01)

(56) References Cited

U.S. PATENT DOCUMENTS

| | | | |
|---|---|---|---|
| 2007/0076587 A1 | 4/2007 | Kwon et al. | |
| 2010/0302983 A1* | 12/2010 | McBeath | H04L 27/2647 370/311 |
| 2012/0014330 A1 | 1/2012 | Damnjanovic et al. | |
| 2015/0341921 A1 | 11/2015 | Chen et al. | |
| 2016/0135213 A1 | 5/2016 | Zhu | |
| 2017/0019909 A1 | 1/2017 | Si et al. | |
| 2018/0343154 A1* | 11/2018 | Park | H04L 5/005 |
| 2019/0109732 A1 | 4/2019 | Choi et al. | |
| 2019/0132862 A1* | 5/2019 | Jeon | H04L 5/0087 |
| 2019/0140727 A1* | 5/2019 | Kim | H04W 72/12 |
| 2019/0199477 A1* | 6/2019 | Park | H04L 1/0067 |
| 2020/0044776 A1* | 2/2020 | Guan | H04W 72/042 |
| 2020/0220700 A1* | 7/2020 | Wu | H04W 28/20 |
| 2020/0288494 A1 | 9/2020 | Heo et al. | |
| 2021/0092717 A1* | 3/2021 | Takeda | H04W 72/042 |

FOREIGN PATENT DOCUMENTS

| | | |
|---|---|---|
| CN | 102238692 A | 11/2011 |
| CN | 103248884 A | 8/2013 |
| CN | 104486271 A | 4/2015 |
| WO | WO-2014163302 A1 | 10/2014 |
| WO | WO-2015143236 A1 | 9/2015 |
| WO | WO-2016137948 A1 | 9/2016 |
| WO | WO-2017171307 A1 | 10/2017 |

OTHER PUBLICATIONS

Samsung: "Signaling to Support Bandwidth Part," 3GPP Draft; R2-1711188 Signaling to Support Bandwidth Part_R1,3rd Generation Partnership Project (3GPP), Mobile Competence Centre; 650, Route Des Lucioles; F-06921 Sophia-Antipolis Cedex; France, vol. RAN WG2, No. Prague, Czech; Oct. 9, 2017-Oct. 13, 2017, Oct. 8, 2017 (Oct. 8, 2017), XP051343195, 7 pages, Retrieved from the Internet: URL: http://www.3gpp.org/ftp/MeetIngs_3GPP_SYNC/RAN2/Docs/ [retrieved on Oct. 8, 2017].

Samsung: "TB/CB Handling for eMBB", 3GPP Draft; R1-1700958, 3rd Generation Partnership Project (3gpp), Mobile Competence Centre ; 650, Route Des Lucioles ; F-06921 Sophia-Antipolis Cedex; France, val. RAN WG1, No. Spokane, USA; Jan. 16, 2017-Jan. 20, 2017 Jan. 16, 2017 (Jan. 16, 2017), XP051208474, 4 pages, Retrieved from the Internet: URL:http://www.3gpp.org/ftp/Meetings_3GPP_SYNC/RAN1/Docs/ [retrieved on Jan. 16, 2017].

AT&T: "Design Considerations for NR Operation with Wide Bandwidths", 3GPP TSG RAN WG1 NR Ad-Hoc#2, 3GPP Draft, R1-1710416 ATT Wideband, 3rd Generation Partnership Project (3GPP), Mobile Competence Centre, 650, Route Des Lucioles, F-06921 Sophia-Antipolis Cedex, France, vol. RAN WG1, No. Qingdao, P.R. China, Jun. 27, 2017-Jun. 30, 2017, Jun. 26, 2017 (Jun. 26, 2017), 5 Pages, XP051299628, Retrieved from the Internet: URL: http://www.3gpp.org/ftp/Meetings_3GPP_SYNC/RAN1/Docs, [retrieved on Jun. 26, 2017], Title, Sections 2-4, Section 6.

Longfei L., et al., "Research on QoS-guaranteed Resource Block Allocation and MCS Selection in LTE-A Femtocell", Computer Science, Oct. 12, 2015, Computer Science vol. 42, No. 8, 26 Pages.

NTT Docomo, Inc., "New Radio (NR) Access Technology, TSG RAN WG1", 3GPP TSG RAN meeting #76, RP-171137, West Palm Beach, USA, Jun. 5-8, 2017 (Year: 2017), 118 Pages.

López-Puigcerver., "Design and Optimization of Bandwidth Part Selection for Massive", IEEE Wireless Communications, Dec. 31, 2012.

* cited by examiner

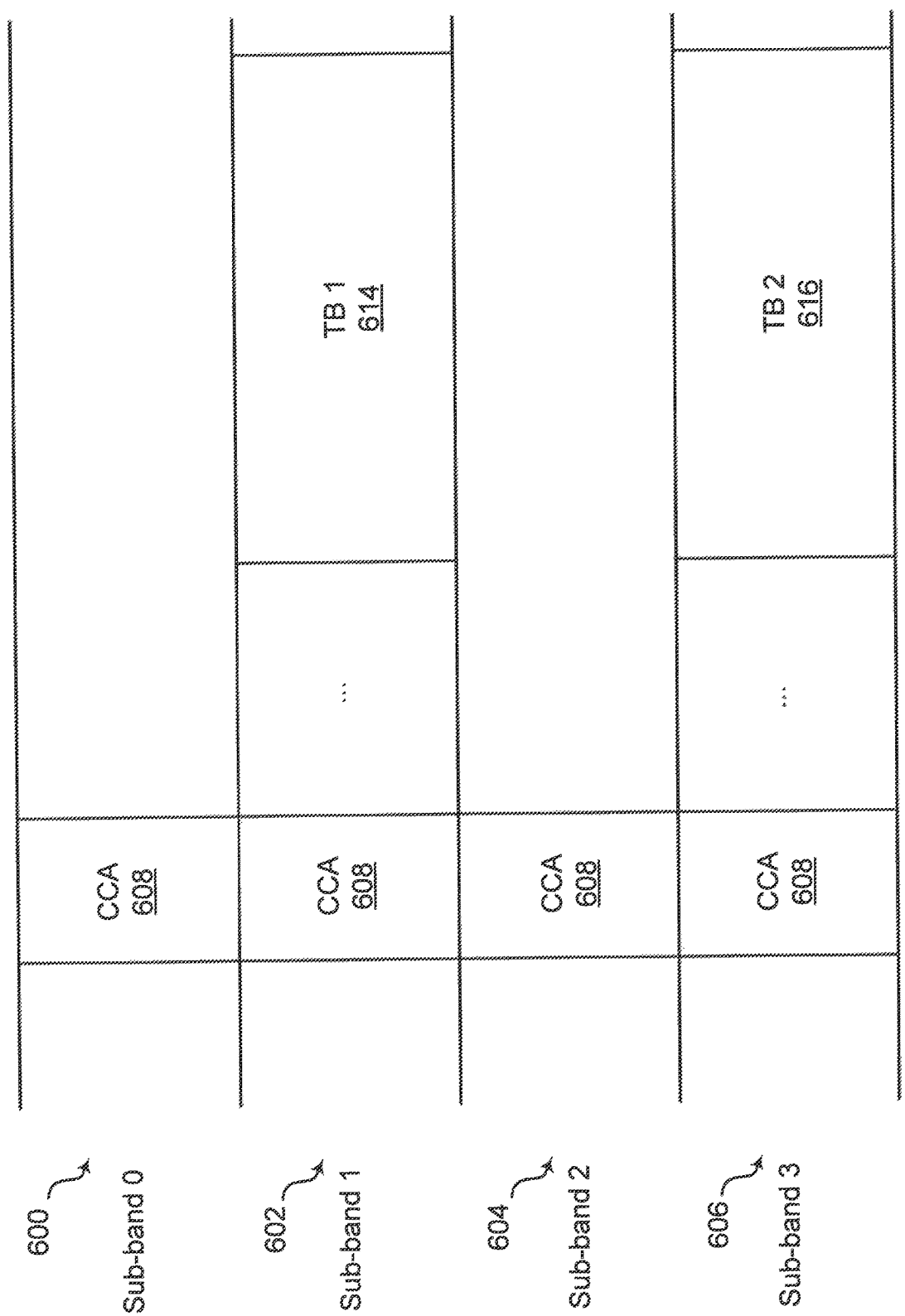

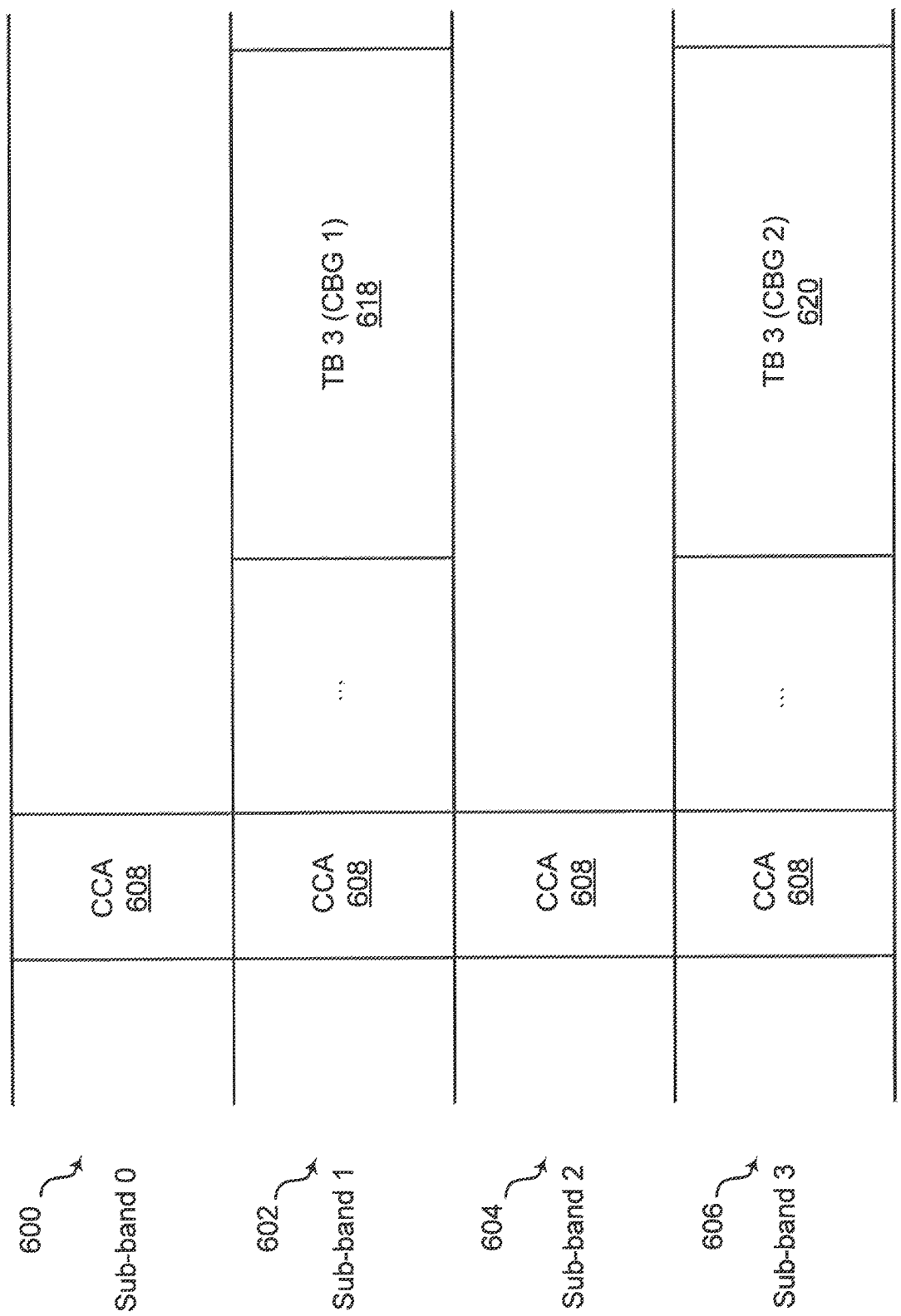

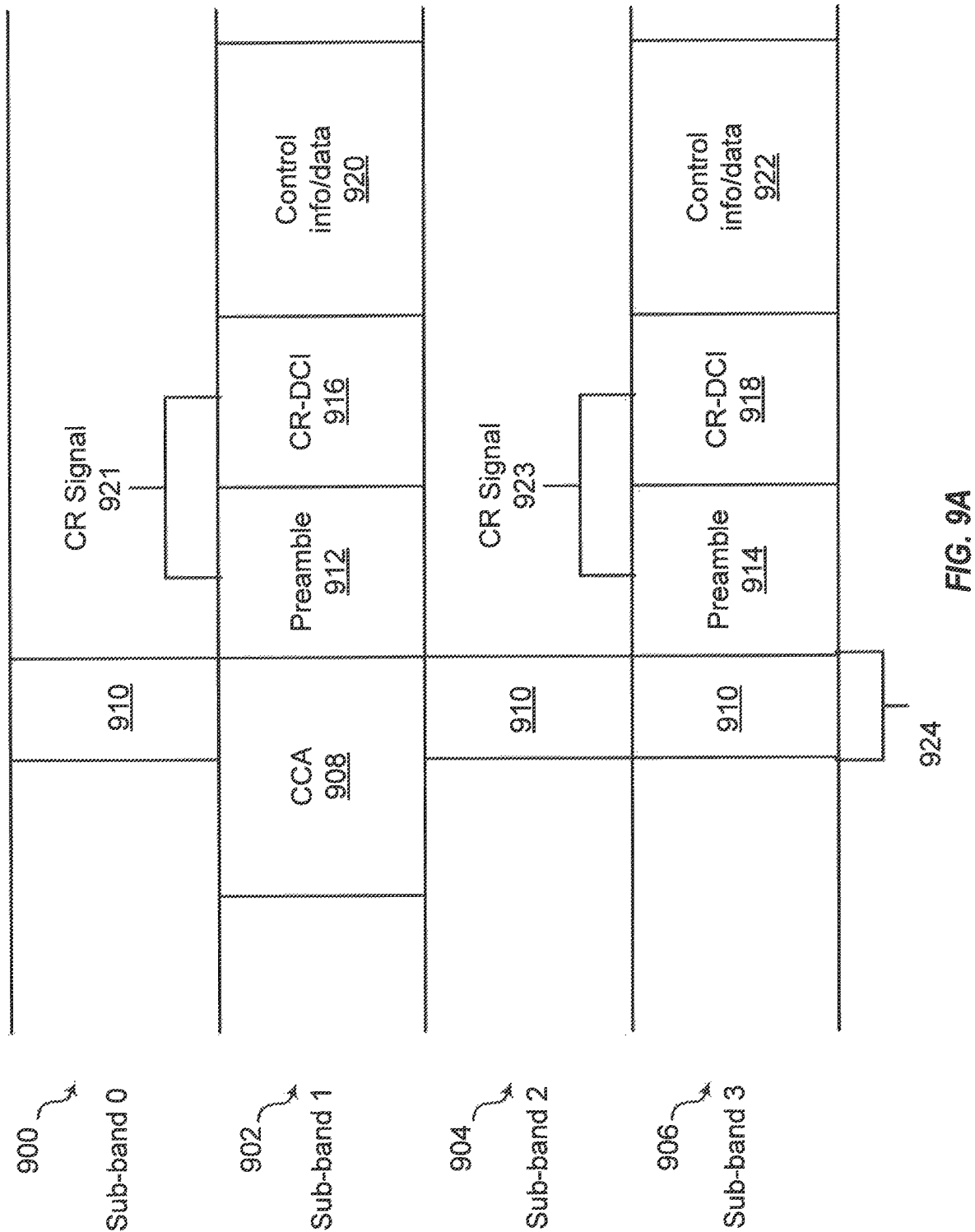

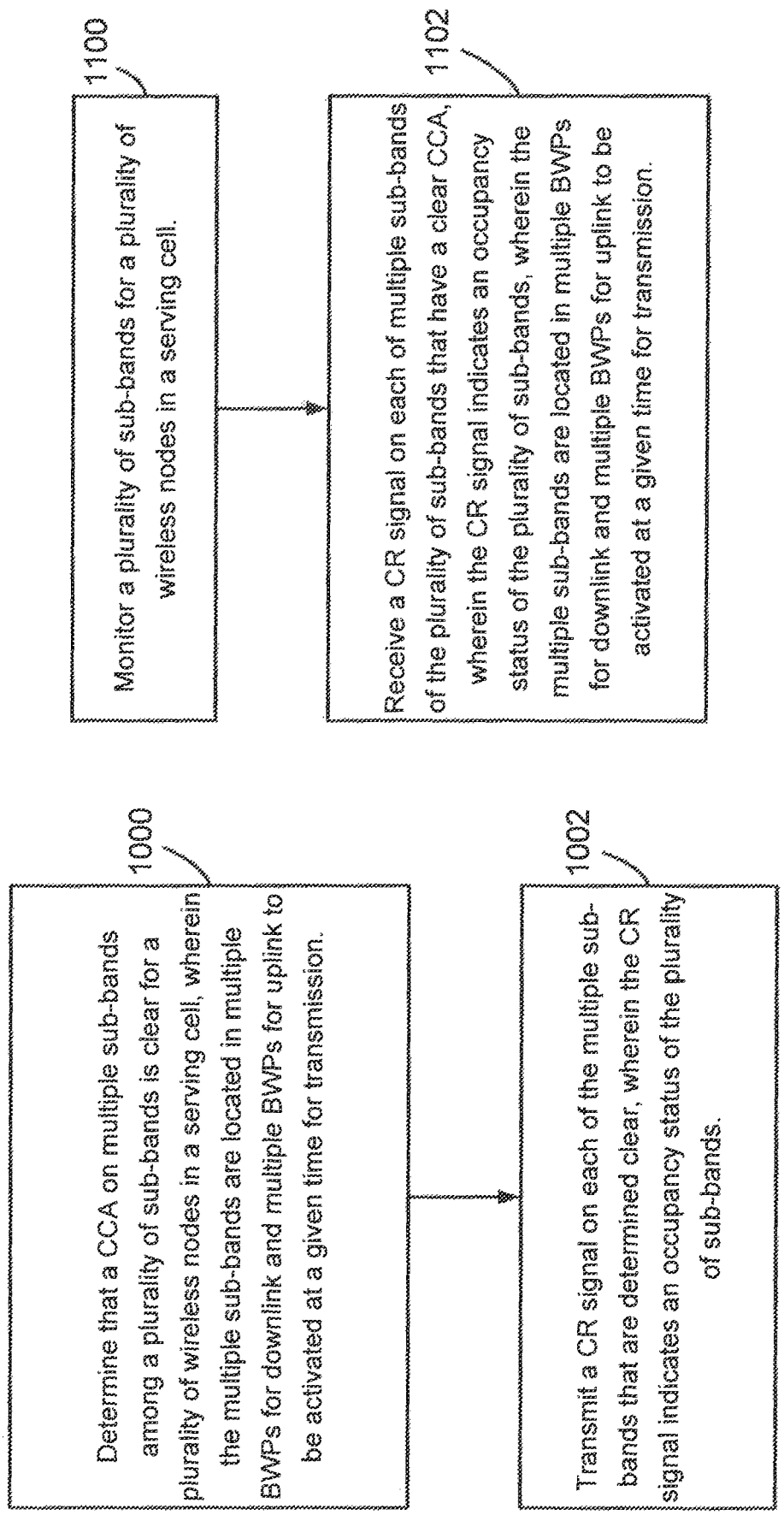

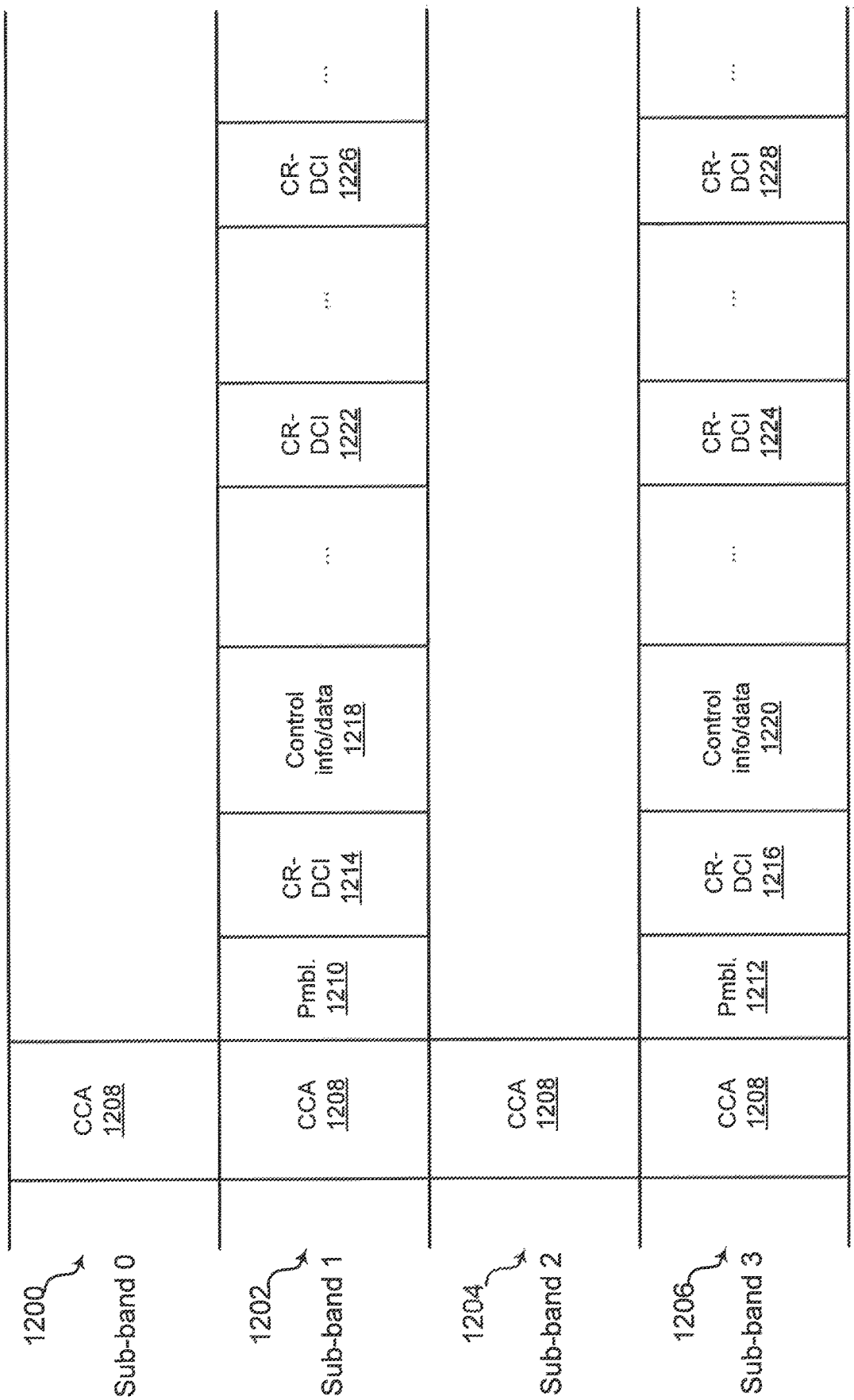

METHODS AND APPARATUS FOR BANDWIDTH PART ENHANCEMENT

CROSS-REFERENCE TO RELATED APPLICATIONS

This application claims the benefit of U.S. Provisional Patent Application No. 62/581,199, entitled, "METHODS AND APPARATUS FOR BANDWIDTH PART ENHANCEMENT," filed on Nov. 3, 2017, which is expressly incorporated by reference herein in its entirety.

BACKGROUND

Field

Aspects of the present disclosure relate generally to wireless communication systems, and more particularly, to bandwidth part (BWP) enhancement.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

New radio (NR) networks support flexible channel bandwidth design for both a network and a UE. For example, for the band frequency range of sub-6 GHz, a channel bandwidth may vary between five (5) MHz and one hundred (100) MHz. As a further example, for the band frequency above twenty-four (24) GHz, a channel bandwidth may vary between fifty (50) MHz and four hundred (400) MHz. Also, NR networks support scalable OFDM numerology. Scaling of subcarrier spacing (SCS) may address different needs by different radio access technologies (RATs). A wideband spectrum for NR networks can be divided into multiple non-overlapping sub-bands. One or more sub-bands may be located in a bandwidth part (BWP). It may be beneficial for enhancing BWP configuration, signaling support, and associated hand-shaking procedures to improve spectrum usage, coverage, and latency.

SUMMARY

In one aspect of the present disclosure, a method of wireless communication is provided. The method includes configuring a plurality of bandwidth parts (BWPs), and activating multiple BWPs for downlink and multiple BWPs for uplink from the plurality of the configured BWPs at a given time.

In an additional aspect of the present disclosure, a method of wireless communication is provided. The method includes receiving downlink control information (DCI) on a physical downlink control channel (PDCCH) that includes bandwidth part (BWP) activation information, and determining activation of multiple BWPs for downlink and multiple BWPs for uplink at a given time based on the received DCI and user equipment (UE) capabilities.

In an additional aspect of the present disclosure, a method of wireless communication is provided. The method includes configuring a primary channel for a plurality of wireless nodes in a serving cell on a first sub-band among a plurality of sub-bands, determining a clear channel assessment (CCA) on the primary channel is clear, determining the CCA on one or more other sub-bands of the plurality of sub-bands is clear after the CCA on the primary channel is determined clear, and transmitting a channel reservation (CR) signal on the primary channel with a clear CCA, the CR signal indicating an occupancy status of the plurality of sub-bands, the first sub-band and the one or more other sub-bands being located in multiple bandwidth parts (BWPs) for downlink and multiple BWPs for uplink to be activated at a given time for transmission.

In an additional aspect of the present disclosure, a method of wireless communication is provided. The method includes monitoring a primary channel for a plurality of wireless nodes in a serving cell on a first sub-band among a plurality of sub-bands, receiving a channel reservation (CR) signal on the primary channel, a clear channel assessment (CCA) on the primary channel being clear, and determining an occupancy status of the plurality of sub-bands based on the received CR signal, the CCA on one or more other sub-bands among the plurality of sub-bands being determined clear after the primary channel is determined clear, the first sub-band and the one or more other sub-bands being located in multiple bandwidth parts (BWPs) for downlink and multiple BWPs for uplink to be activated at a given time for transmission.

In an additional aspect of the present disclosure, a method of wireless communication is provided. The method includes determining that a clear channel assessment (CCA) on multiple sub-bands among a plurality of sub-bands is clear for a plurality of wireless nodes in a serving cell, the multiple sub-bands being located in multiple bandwidth parts (BWPs) for downlink and multiple BWPs for uplink to be activated at a given time for transmission, and transmitting a channel reservation (CR) signal on each of the multiple sub-bands that are determined clear, the CR signal indicating an occupancy status of the plurality of sub-bands.

In an additional aspect of the present disclosure, a method of wireless communication is provided. The method includes monitoring a plurality of sub-bands for a plurality of wireless nodes in a serving cell, and receiving a channel reservation (CR) signal on each of multiple sub-bands of the plurality of sub-bands that have a clear clear channel assessment (CCA), the CR signal indicating an occupancy status of the plurality of sub-bands, the multiple sub-bands being located in multiple bandwidth parts (BWPs) for downlink and multiple BWPs for uplink to be activated at a given time for transmission.

In one aspect of the present disclosure, an apparatus of wireless communication is provided. The apparatus includes means for configuring a plurality of bandwidth parts (BWPs), and means for activating multiple BWPs for downlink and multiple BWPs for uplink from the plurality of the configured BWPs at a given time.

In an additional aspect of the present disclosure, an apparatus of wireless communication is provided. The apparatus includes means for receiving downlink control information (DCI) on a physical downlink control channel (PDCCH) that includes bandwidth part (BWP) activation information, and means for determining activation of multiple BWPs for downlink and multiple BWPs for uplink at a given time based on the received DCI and user equipment (UE) capabilities.

In an additional aspect of the present disclosure, an apparatus of wireless communication is provided. The apparatus includes means for configuring a primary channel for a plurality of wireless nodes in a serving cell on a first sub-band among a plurality of sub-bands, means for determining a clear channel assessment (CCA) on the primary channel is clear, means for determining the CCA on one or more other sub-bands of the plurality of sub-bands is clear after the CCA on the primary channel is determined clear, and means for transmitting a channel reservation (CR) signal on the primary channel with a clear CCA, the CR signal indicating an occupancy status of the plurality of sub-bands, the first sub-band and the one or more other sub-bands being located in multiple bandwidth parts (BWPs) for downlink and multiple BWPs for uplink to be activated at a given time for transmission.

In an additional aspect of the present disclosure, an apparatus of wireless communication is provided. The apparatus includes means for monitoring a primary channel for a plurality of wireless nodes in a serving cell on a first sub-band among a plurality of sub-bands, means for receiving a channel reservation (CR) signal on the primary channel, a clear channel assessment (CCA) on the primary channel being clear, and means for determining an occupancy status of the plurality of sub-bands based on the received CR signal, the CCA on one or more other sub-bands among the plurality of sub-bands being determined clear after the primary channel is determined clear, the first sub-band and the one or more other sub-bands being located in multiple bandwidth parts (BWPs) for downlink and multiple BWPs for uplink to be activated at a given time for transmission.

In an additional aspect of the present disclosure, an apparatus of wireless communication is provided. The apparatus includes means for determining that a clear channel assessment (CCA) on multiple sub-bands among a plurality of sub-bands is clear for a plurality of wireless nodes in a serving cell, the multiple sub-bands being located in multiple bandwidth parts (BWPs) for downlink and multiple BWPs for uplink to be activated at a given time for transmission, and means for transmitting a channel reservation (CR) signal on each of the multiple sub-bands that are determined clear, the CR signal indicating an occupancy status of the plurality of sub-bands.

In an additional aspect of the present disclosure, an apparatus of wireless communication is provided. The apparatus includes means for monitoring a plurality of sub-bands for a plurality of wireless nodes in a serving cell, and means for receiving a channel reservation (CR) signal on each of multiple sub-bands of the plurality of sub-bands that have a clear clear channel assessment (CCA), the CR signal indicating an occupancy status of the plurality of sub-bands, the multiple sub-bands being located in multiple bandwidth parts (BWPs) for downlink and multiple BWPs for uplink to be activated at a given time for transmission.

In one aspect of the disclosure, a non-transitory computer-readable medium has program code recorded thereon. The program code further includes program code executable by a computer for causing the computer to configure a plurality of bandwidth parts (BWPs), and program code executable by the computer for causing the computer to activate multiple BWPs for downlink and multiple BWPs for uplink from the plurality of the configured BWPs at a given time.

In an additional aspect of the present disclosure, a non-transitory computer-readable medium has program code recorded thereon. The program code further includes program code executable by a computer for causing the computer to receive downlink control information (DCI) on a physical downlink control channel (PDCCH) that includes bandwidth part (BWP) activation information, and program code executable by the computer for causing the computer to determine activation of multiple BWPs for downlink and multiple BWPs for uplink at a given time based on the received DCI and user equipment (UE) capabilities.

In an additional aspect of the present disclosure, a non-transitory computer-readable medium has program code recorded thereon. The program code further includes program code executable by a computer for causing the computer to configure a primary channel for a plurality of wireless nodes in a serving cell on a first sub-band among a plurality of sub-bands, includes program code executable by the computer for causing the computer to determine a clear channel assessment (CCA) on the primary channel is clear, program code executable by the computer for causing the computer to determine the CCA on one or more other sub-bands of the plurality of sub-bands is clear after the CCA on the primary channel is determined clear, and program code executable by the computer for causing the computer to transmit a channel reservation (CR) signal on the primary channel with a clear CCA, the CR signal indicating an occupancy status of the plurality of sub-bands, the first sub-band and the one or more other sub-bands being located in multiple bandwidth parts (BWPs) for downlink and multiple BWPs for uplink to be activated at a given time for transmission.

In an additional aspect of the present disclosure, a non-transitory computer-readable medium has program code recorded thereon. The program code further includes program code executable by a computer for causing the computer to monitor a primary channel for a plurality of wireless nodes in a serving cell on a first sub-band among a plurality of sub-bands, program code executable by the computer for causing the computer to receive a channel reservation (CR) signal on the primary channel, a clear channel assessment (CCA) on the primary channel being clear, and program code executable by the computer for causing the computer to determine an occupancy status of the plurality of sub-bands based on the received CR signal, the CCA on one or more other sub-bands among the plurality of sub-bands being determined clear after the primary channel is determined clear, the first sub-band and the one or more other sub-bands being located in multiple bandwidth parts (BWPs) for downlink and multiple BWPs for uplink to be activated at a given time for transmission.

In an additional aspect of the present disclosure, a non-transitory computer-readable medium has program code recorded thereon. The program code further includes program code executable by a computer for causing the computer to determine that a clear channel assessment (CCA) on multiple sub-bands among a plurality of sub-bands is clear for a plurality of wireless nodes in a serving cell, the multiple sub-bands being located in multiple bandwidth parts (BWPs) for downlink and multiple BWPs for uplink to be activated at a given time for transmission, and program code executable by the computer for causing the computer to transmit a channel reservation (CR) signal on each of the multiple sub-bands that are determined clear, the CR signal indicating an occupancy status of the plurality of sub-bands.

In an additional aspect of the present disclosure, a non-transitory computer-readable medium has program code recorded thereon. The program code further includes program code executable by a computer for causing the computer to monitor a plurality of sub-bands for a plurality of wireless nodes in a serving cell, and program code further includes program code executable by the computer for causing the computer to receive a channel reservation (CR) signal on each of multiple sub-bands of the plurality of sub-bands that have a clear clear channel assessment (CCA), the CR signal indicating an occupancy status of the plurality of sub-bands, the multiple sub-bands being located in multiple bandwidth parts (BWPs) for downlink and multiple BWPs for uplink to be activated at a given time for transmission.

In one aspect of the disclosure, an apparatus configured for wireless communication is disclosed. The apparatus includes at least one processor, and a memory coupled to the processor. The processor is configured to configure a plurality of bandwidth parts (BWPs), and to activate multiple BWPs for downlink and multiple BWPs for uplink from the plurality of the configured BWPs at a given time.

In an additional aspect of the present disclosure, an apparatus configured for wireless communication is disclosed. The apparatus includes at least one processor, and a memory coupled to the processor. The processor is configured to receive downlink control information (DCI) on a physical downlink control channel (PDCCH) that includes bandwidth part (BWP) activation information, and to determine activation of multiple BWPs for downlink and multiple BWPs for uplink at a given time based on the received DCI and user equipment (UE) capabilities.

In an additional aspect of the present disclosure, an apparatus configured for wireless communication is disclosed. The apparatus includes at least one processor, and a memory coupled to the processor. The processor is configured to configure a primary channel for a plurality of wireless nodes in a serving cell on a first sub-band among a plurality of sub-bands, determining a clear channel assessment (CCA) on the primary channel is clear, to determine the CCA on one or more other sub-bands of the plurality of sub-bands is clear after the CCA on the primary channel is determined clear, and to transmit a channel reservation (CR) signal on the primary channel with a clear CCA, the CR signal indicating an occupancy status of the plurality of sub-bands, the first sub-band and the one or more other sub-bands being located in multiple bandwidth parts (BWPs) for downlink and multiple BWPs for uplink to be activated at a given time for transmission.

In an additional aspect of the present disclosure, an apparatus configured for wireless communication is disclosed. The apparatus includes at least one processor, and a memory coupled to the processor. The processor is configured to monitor a primary channel for a plurality of wireless nodes in a serving cell on a first sub-band among a plurality of sub-bands, to receive a channel reservation (CR) signal on the primary channel, a clear channel assessment (CCA) on the primary channel being clear, and to determine an occupancy status of the plurality of sub-bands based on the received CR signal, the CCA on one or more other sub-bands among the plurality of sub-bands being determined clear after the primary channel is determined clear, the first sub-band and the one or more other sub-bands being located in multiple bandwidth parts (BWPs) for downlink and multiple BWPs for uplink to be activated at a given time for transmission.

In an additional aspect of the present disclosure, an apparatus configured for wireless communication is disclosed. The apparatus includes at least one processor, and a memory coupled to the processor. The processor is configured to determine that a clear channel assessment (CCA) on multiple sub-bands among a plurality of sub-bands is clear for a plurality of wireless nodes in a serving cell, the multiple sub-bands being located in multiple bandwidth parts (BWPs) for downlink and multiple BWPs for uplink to be activated at a given time for transmission, and to transmit a channel reservation (CR) signal on each of the multiple sub-bands that are determined clear, the CR signal indicating an occupancy status of the plurality of sub-bands.

In an additional aspect of the present disclosure, an apparatus configured for wireless communication is disclosed. The apparatus includes at least one processor, and a memory coupled to the processor. The processor is configured to monitor a plurality of sub-bands for a plurality of wireless nodes in a serving cell, and to receive a channel reservation (CR) signal on each of multiple sub-bands of the plurality of sub-bands that have a clear clear channel assessment (CCA), the CR signal indicating an occupancy status of the plurality of sub-bands, the multiple sub-bands being located in multiple bandwidth parts (BWPs) for downlink and multiple BWPs for uplink to be activated at a given time for transmission.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 6A, 6B, and 6C are block diagrams illustrating TB scheduling supported by activation of multiple BWPs according to one aspect of the present disclosure.

FIGS. 9A and 9B are block diagrams illustrating details regarding sub-band based LBT using a primary channel according to one aspect of the present disclosure.

FIG. 10 is a functional block diagram illustrating exemplary blocks executed to implement sub-band based LBT to support activation of multiple BWPs for downlink and uplink according to one aspect of the present disclosure.

FIG. 11 is a functional block diagram illustrating exemplary blocks executed to implement sub-band based LBT to support activation of multiple BWPs for downlink and uplink according to another aspect of the present disclosure.

FIGS. 12A and 12B are block diagrams illustrating details regarding sub-band based LBT according to one aspect of the present disclosure.

DETAILED DESCRIPTION

Figure 1:
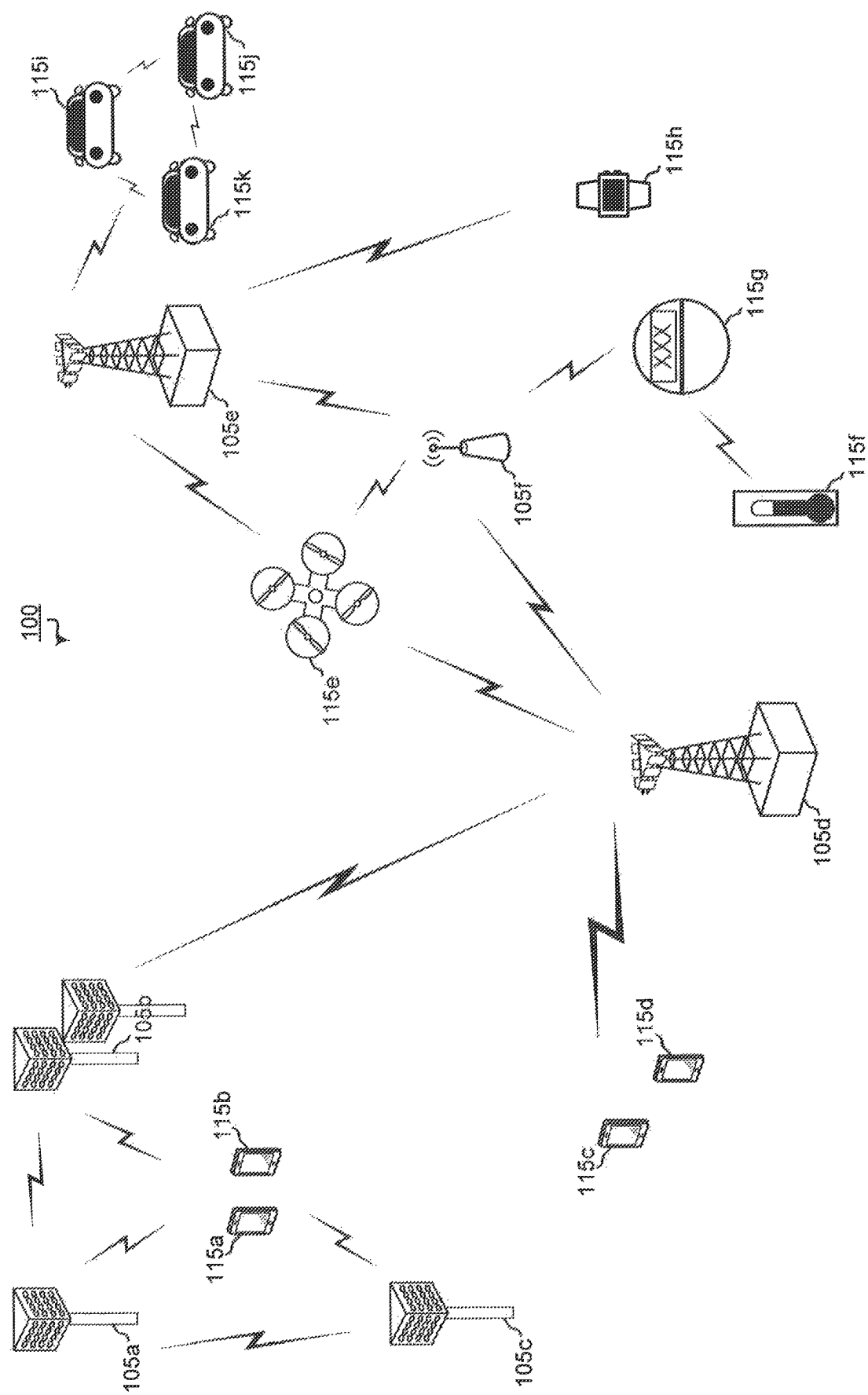
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105$d$ and 105$e$ are regular macro base stations, while base stations 105$a$-105$c$ are macro base stations enabled with one of 3 dimension (3D), full dimension (FD), or massive MIMO. Base stations 105$a$-105$c$ take advantage of their higher dimension MIMO capabilities to exploit 3D beamforming in both elevation and azimuth beamforming to increase coverage and capacity. Base station 105$f$ is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
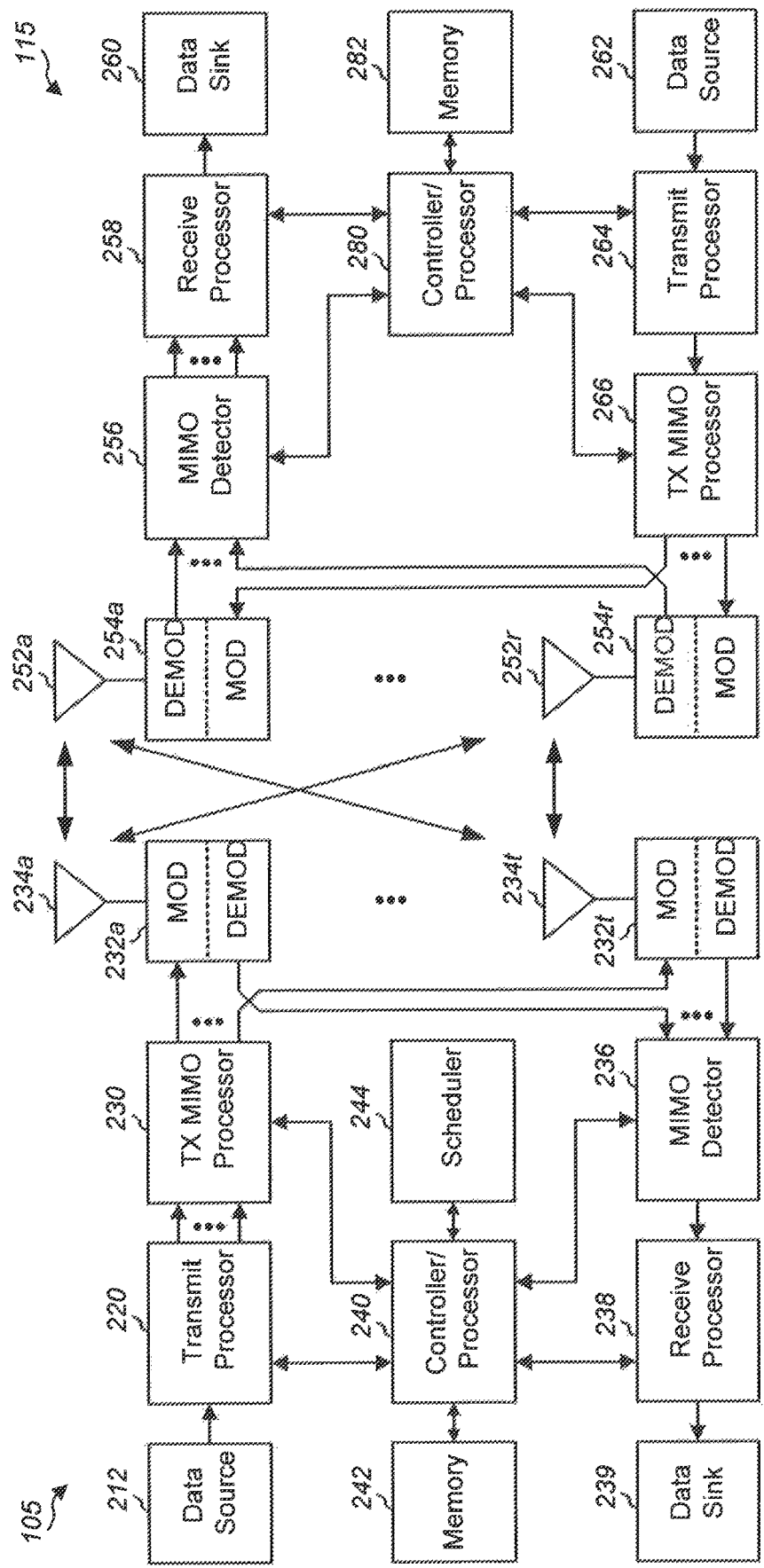
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4, 5, 7, 8, 10, and 11, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
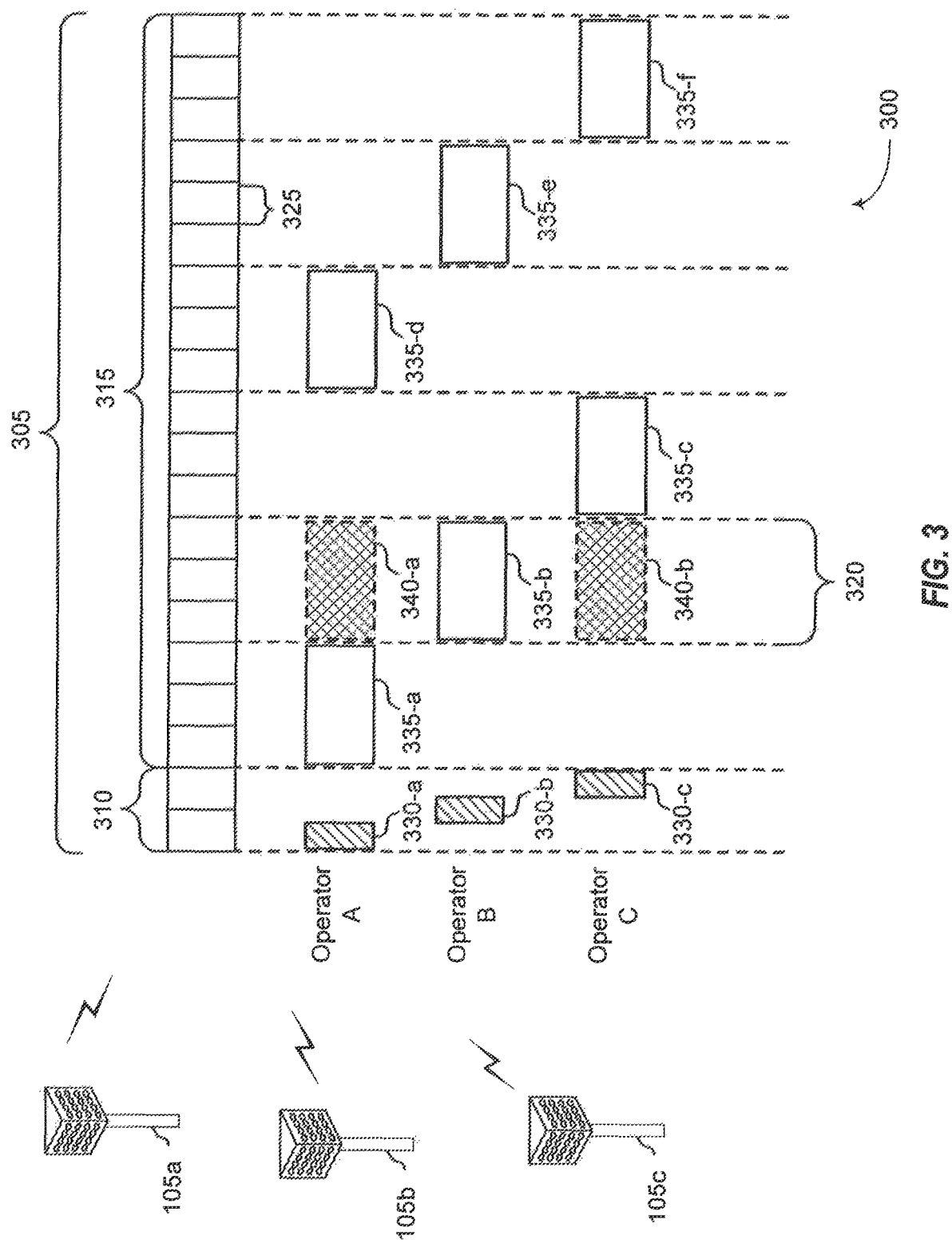
FIG. 3 illustrates an example of a timing diagram for coordinated resource partitioning.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g. UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for ongoing communications on multiple sub-bands before transmitting their own data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than one operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

New radio (NR) networks support flexible channel bandwidth design for both a network and a UE. A set of channel bandwidths may be determined based on the band frequency (e.g., center frequency) and subcarrier spacing (SCS). A bandwidth may include one or more bandwidth parts (BWPs). Therefore, each BWP may be configured with a specific numerology, such as SCS and cyclic prefix (CP), a band frequency, and a bandwidth. A BWP may include one or more physical resource blocks (PRBs). The PRBs in a BWP may be contiguous or separated by one or more reserved resources. Compared with carrier aggregation (CA), the configuration of BWP is more flexible and reliable for diverse UE categories and requirements. For example, different UEs that have different processing capabilities may be allocated with different BWPs with different SCSs. In other words, the configuration of BWP may be UE-specific. Also, the configuration of BWP for downlink and uplink can be different.

In NR networks, a shared radio frequency spectrum band, which may include licensed or unlicensed frequency spectrum, can be divided into multiple non-overlapping sub-bands. One or more non-overlapping sub-bands may be located in a BWP. In an unlicensed frequency portion of the shared radio frequency spectrum band, a base station, a gNB, a UE, or a wireless node in the networks, may access one or more sub-bands in one or more BWPs on an opportunistic basis by performing medium sensing procedures. For a given transmission opportunity (TxOP), only a portion of shared spectrum can be utilized. For example, a wireless node in NR networks (i.e., NR node) may perform a CCA in order to determine whether certain sub-bands or channels are occupied by other NR nodes or incumbent users. The incumbent users may refer to UEs or wireless nodes that utilize different RATs, such as WiFi nodes, license assisted access (LAA) nodes, enhanced LAA nodes, or MulteFire (MF) nodes. Therefore, for each UE, the aggregated bandwidth of BWPs may be bounded by the aggregated bandwidth of sub-bands that have clear CCA.

Currently, in licensed frequency spectrum, only one BWP for downlink and one BWP for uplink at most, may be activated at a given time. However, such single BWP operation may not be sufficient for shared radio frequency spectrum, especially for unlicensed frequency spectrum. For example, the access of radio resources in unlicensed deployment is opportunistic, and, therefore, the chance of missing data transmitted on only one active BWP for downlink or uplink is higher. Also, single BWP operation may not be enough to accommodate various users. For instance, an LAA node, either in a stand-alone mode or dual connected mode, may operate on different carrier frequencies and occupy different bandwidths. Further, switching a BWP may require guard time and extra signaling within a TxOP for a hand-shaking procedure. Therefore, single BWP operation may increase the frequency of BWP switching and so increase latency and signaling overhead. Moreover, in licensed frequency spectrum, there is little limitation on power boosting within a BWP, such as power boosting in PUCCH, sounding reference signal (SRS), and physical random access channel (PRACH). However, in unlicensed frequency spectrum, power boosting, especially power ramping on UL, may not always be admissible due to regulatory requirements.

Various aspects of the present disclosure provide BWP enhancement for NR shared radio frequency spectrum. Multiple BWPs for downlink and uplink across multiple sub-bands may be activated at a given time to support different numerologies required in different scenarios. Scaling of numerologies, such as SCS and CP, may help to meet different deployment requirements. For example, synchronization signals, remaining minimum system information (RMSI) control channel resource set (CORESET) configuration, group common PDCCH and system information may be broadcast on resources configured with a larger CP and a smaller SCS as such signals and information are broadcast within a serving cell and need to have a broader coverage to reach all UEs in the serving cell, including UEs located near the boundary of the serving cell. In contrast, data traffic unicast to a UE that is close to a gNB may be transmitted on resources configured with a smaller CP and a larger SCS. Also, flexible numerologies may accommodate different UE categories (e.g. enhanced mobile broadband (eMBB), enhanced machine type communications (eMTC), narrowband Internet of Things (NB-IoT)), different UE capabilities of the same UE category, and QoS requirements and provide supplementary means of link adaptation under power spectral density (PSD) limitation. For instance, SCS may be widened to increase PSD limitation to resolve power ramping issues.

Further aspects of the present disclosure provide PDCCH configuration for downlink control information (DCI) for activation of multiple BWPs for downlink and uplink at a given time and PDSCH scheduling on the multiple activated BWPs. Activation of multiple BWPs for downlink and uplink may increase the freedom of resource allocation, scheduling, and rate matching since a large transport block (TB) may be transmitted as multiple code blocks with different numerologies. Using limited frequency spectrum more efficiently may also reduce scheduling latency and overhead of re-transmissions.

Additional aspects of the present disclosure provide sub-band based LBT, such as sub-band based CCA, to support multiple BWPs for downlink and uplink on multiple sub-bands to be activated at a given time after the sub-band based CCA is clear. Sub-band based LBT/CCA may be performed on a sub-band basis to determine the availability of sub-band. Different detection mechanism in LBT/CCA may be adopted for different RATs.

Figure 4:
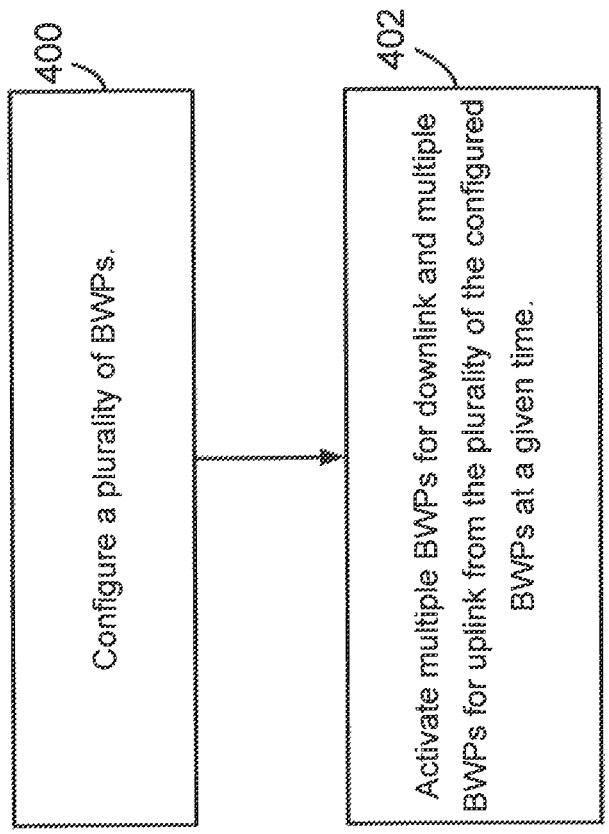
FIG. 4 is a functional block diagram illustrating exemplary blocks executed to implement BWP enhancement according to one aspect of the present disclosure.

FIG. 4 is a functional block diagram illustrating exemplary blocks executed to implement BWP enhancement according to one aspect of the present disclosure. The example blocks may be implemented by a base station, such as base station 105 or base station 1300 in FIGS. 1, 2, 3, and 13. For NR networks, the base station may be a serving gNB. At block 400, a base station may configure a plurality of bandwidth parts (BWPs). A BWP may be on one or more sub-bands. At block 402, the base station may activate multiple BWPs for downlink and multiple BWPs for uplink from the plurality of the configured BWPs at a given time. The activated BWPs may be on multiple sub-bands.

In certain aspects of the present disclosure, a base station may transmit DCI on a PDCCH that includes BWP activation information. The BWP activation information may be a set of configuration parameters carried by DCI of a UE-specific PDCCH. The BWP activation information may include not only BWP activation information for a current BWP on which the PDCCH is transmitted but also BWP activation information for one or more other BWPs. Such cross-indication of BWP activation information may serve integrity check purposes to increase overall reliability.

The DCI for activating a single BWP in licensed frequency spectrum may include a frequency location, a bandwidth, SCS, a CP length, reserved sub-bands information within the BWP, or any combination thereof. The DCI for activating multiple BWPs for downlink and uplink in unlicensed frequency spectrum may further include a link direction and a schedule of the multiple BWPs for downlink and uplink. The schedule of the multiple BWPs for downlink and uplink may indicate on/off time of activation during which a UE may operate on such BWPs. The scheduling information may be relevant since access of the TxOP is on an opportunistic basis subject to CCA. In certain scenarios, the DCI may also include tracking reference signal (TRS) configuration. Because a base station may not transmit synchronization blocks in each of the multiple BWPs, a UE may perform synchronization based on the received TRS.

In some aspects of the present disclosure, a base station may configure a control channel resource set (CORESET) for DCI on PDCCH for activation of multiple BWPs for downlink and uplink. A BWP may include one or more sub-bands. Therefore, if cross-sub-band scheduling is employed for downlink assignment or uplink grant, CORESET configuration for PDCCH and PDSCH scheduling may be specified with both a resource block (RB) index and a sub-band index. The RB index may be used to indicate the location of RB. The sub-band index may be used to indicate the location of sub-band within a BWP.

DCI may be configured to be fully contained in a single sub-band in a single BWP. An additional pointer may be included in the self-contained DCI to point to an address of a next sub-band of the single sub-band. In some cases, DCI may be configured to be contained in a cluster of sub-bands in one or more BWPs. Accordingly, DCI may include an additional puncturing pattern to indicate locations of the clustered sub-bands. The puncturing pattern may be explicitly signaled by a base station or blindly detected by a UE. Preferably, sub-bands that are active (with "on" status of channel activity) and close to each other may be aggregated to form a cluster of sub-bands for wideband puncturing.

Figure 5:
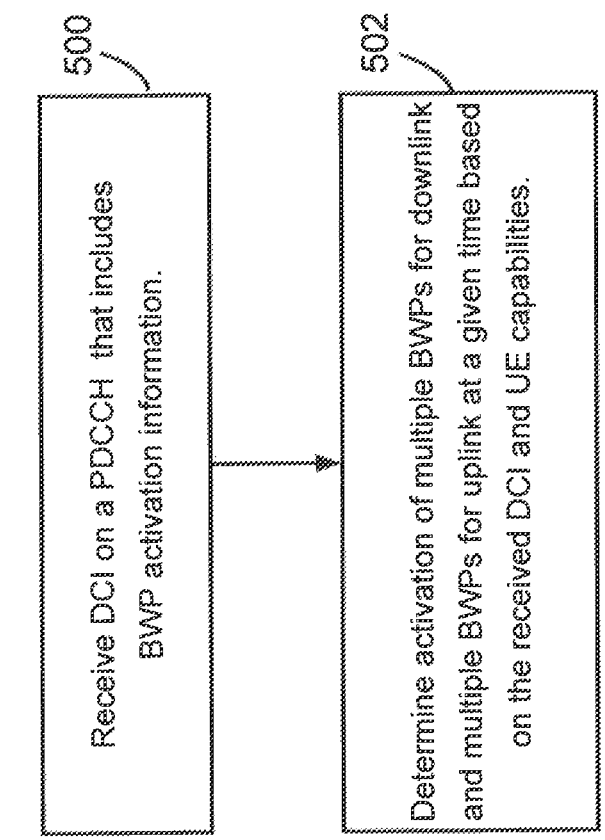
FIG. 5 is a functional block diagram illustrating exemplary blocks executed to implement BWP enhancement according to another aspect of the present disclosure.

FIG. 5 is a functional block diagram illustrating exemplary blocks executed to implement BWP enhancement according to another aspect of the present disclosure. The example blocks may be implemented by a UE, such as UE 115 or UE 1400 in FIGS. 1, 2, 3, and 14. For NR networks, the UE may be a desirable user or an aggressor. At block 500, a UE may receive downlink control information (DCI) on a physical downlink control channel (PDCCH) that includes BWP activation information. At block 502, the UE may determine activation of multiple BWPs for downlink and multiple BWPs for uplink at a given time based on the received DCI and UE capabilities. Different UEs may have different UE capabilities to process signals on various bandwidths and with various features. The UE may determine activation of multiple BWPs by processing DCI in one sub-band when DCI is self-contained in such sub-band. On the other hand, the UE may determine activation of multiple BWP by processing DCI in a cluster of sub-bands when the DCI is spread in such cluster of sub-bands. Accordingly, the UE may monitor the multiple activated BWPs for downlink for control information or data traffic and/or transmit control information or data traffic on the multiple activated BWPs for uplink.

In an additional aspect of the present disclosure, a base station may schedule one or more TBs on a PDSCH. A base station may schedule a single TB on a PDSCH over a single sub-band in one of the multiple activated BWPs for downlink, or over multiple sub-bands in one or more of the multiple activated BWPs for downlink. A TB may include one or more code block groups (CBGs). A base station may perform a frequency first mapping to schedule TBs. Correspondingly, a UE may receive one or more TB transmitted on the PDSCH.

Figure 6A:
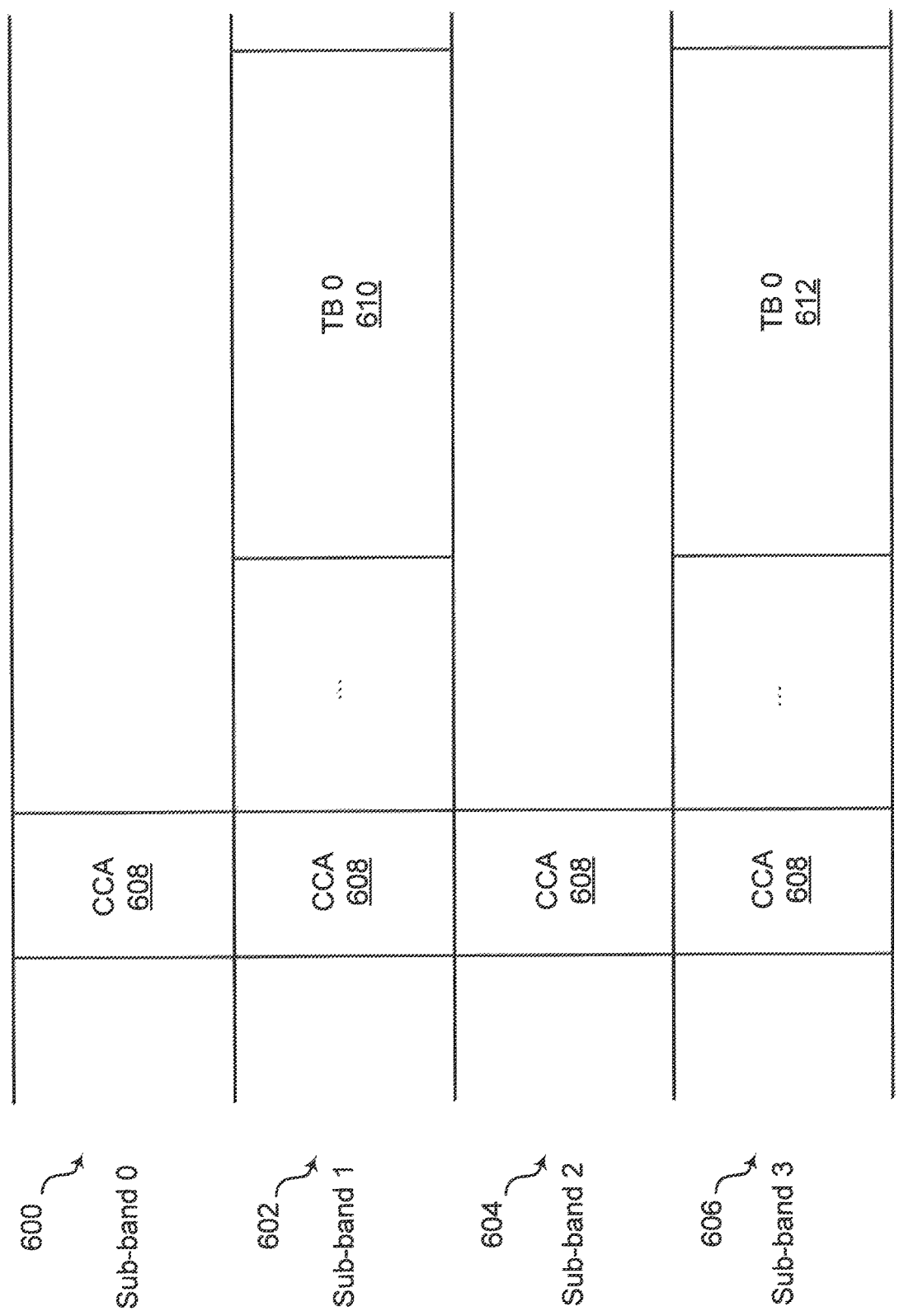

FIGS. 6A, 6B, and 6C are block diagrams illustrating TB scheduling supported by activation of multiple BWPs according to one aspect of the present disclosure. FIG. 6A illustrates that a single TB may be transmitted on multiple sub-bands. In FIG. 6A, TB 0 610 and 612 may be transmitted on sub-band 1 602 and sub-band 3 606, both of which have passed CCA 608. Information contained in TB 0 610 and 612 may be fully or partially identical. Sub-band 0 600 and sub-band 2 604 do not pass CCA 608 and so cannot be activated and scheduled with any TB transmission. FIG. 6B illustrates that a single TB may be transmitted on a single sub-band. In FIG. 6B, TB 1 614 may be transmitted on sub-band 1 602 and TB 2 616 may be transmitted on sub-band 3 606. TB 1 614 and TB 2 616 may have different modulation and coding schemes (MCSs) and so may be scheduled by different grants. Transmitting a single TB on a single sub-band may support sub-band based channel state information (CSI) reporting. FIG. 6C illustrates that different CBGs of a single TB may be transmitted on multiple sub-bands. In FIG. 6C, CBG 1 of TB 3 618 may be transmitted on sub-band 1 602 and CBG 2 of TB 3 620 may be transmitted on sub-band 3 606. CBG 1 of TB 3 618 and CBG 2 of TB 3 620 may have different MCSs and gains. In some cases, there may be multiple CBGs in a TB to be transmitted on a sub-band. Such multiple CBGs may be rate-matched per sub-band.

Figure 7:
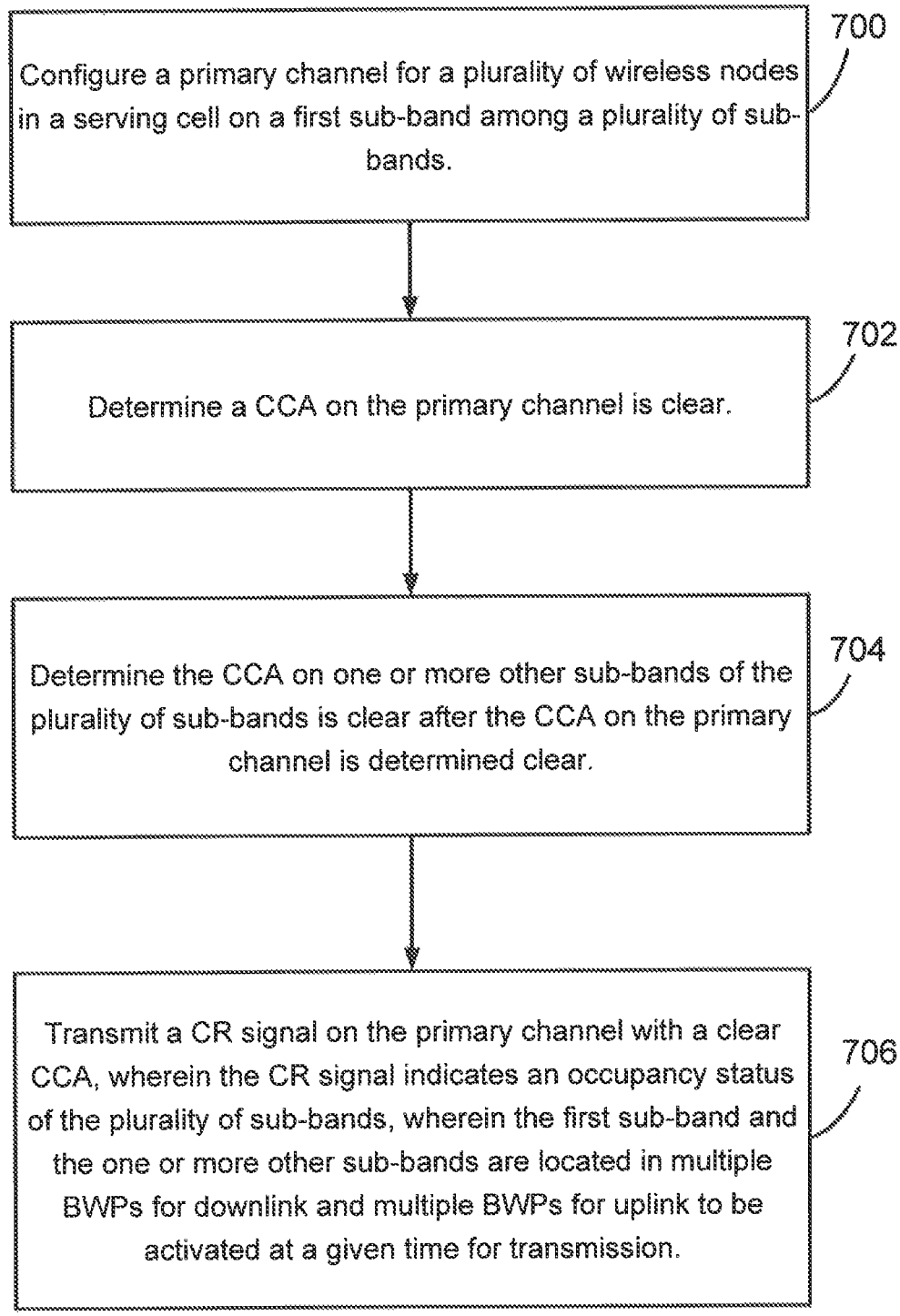
FIG. 7 is a functional block diagram illustrating exemplary blocks executed to implement sub-band based LBT using a primary channel to support activation of multiple BWPs for downlink and uplink according to one aspect of the present disclosure.

FIG. 7 is a functional block diagram illustrating exemplary blocks executed to implement sub-band based LBT using a primary channel to support activation of multiple BWPs for downlink and uplink according to one aspect of the present disclosure. The example blocks may be implemented by a base station, such as base station 105 or base station 1300 in FIGS. 1, 2, 3, and 13. For NR networks, the base station may be a serving gNB. At block 700, a base station may configure a primary channel for a plurality of wireless nodes in a serving cell on a first sub-band among a plurality of sub-bands. The primary channel may be agreed upon by the plurality of wireless nodes in the serving cell. At block 702, the base station may determine a clear channel assessment (CCA) on the primary channel is clear. At block 704, the base station may determine the CCA on one or more other sub-bands of the plurality of sub-bands is clear after the CCA on the primary channel is determined clear. At block 706, the base station may transmit a channel reservation (CR) signal on the primary channel with a clear CCA. The CR signal may indicate an occupancy status of the plurality of sub-bands. In some cases, a second CR signal may be transmitted on the one or more other sub-bands of the plurality of sub-bands. The sub-band based LBT is a hand-shaking procedure per sub-band. It may occur before multiple sub-bands, including the first sub-band for the primary channel, in multiple BWPs for downlink and uplink are activated at a later point of time for transmission.

Figure 8:
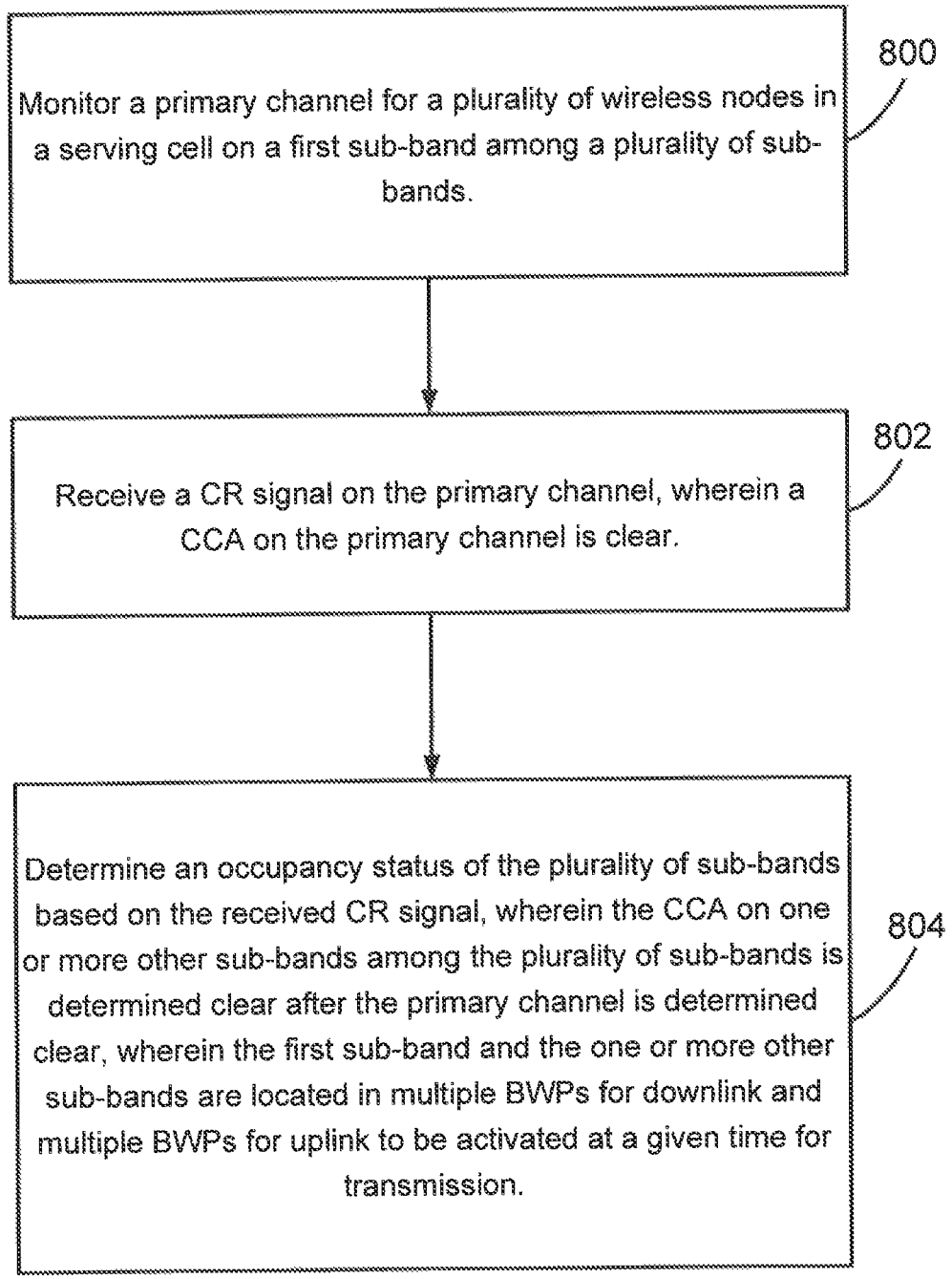
FIG. 8 is a functional block diagram illustrating exemplary blocks executed to implement sub-band based LBT using a primary channel to support activation of multiple BWPs for downlink and uplink according to another aspect of the present disclosure.

FIG. 8 is a functional block diagram illustrating exemplary blocks executed to implement sub-band based LBT using a primary channel to support activation of multiple BWPs for downlink and uplink according to another aspect of the present disclosure. The example blocks may be implemented by a UE, such as UE 115 or UE 1400 in FIGS. 1, 2, 3, and 14. For NR networks, the UE may be a desirable user or an aggressor. At block 800, a UE may monitor a primary channel for a plurality of wireless nodes in a serving cell on a first sub-band among a plurality of sub-bands. At block 802, the UE may receive a channel reservation (CR) signal on the primary channel with a clear clear channel assessment (CCA). At block 804, the UE may determine an occupancy status of the plurality of sub-bands based on the received CR signal. The CCA on one or more other sub-bands among the plurality of sub-bands may be determined clear after the primary channel is determined clear. In some cases, the UE may receive a second CR signal on the one or more other sub-bands of the plurality of sub-bands.

FIG. 9A are block diagrams illustrating details regarding sub-band based LBT using a primary channel according to one aspect of the present disclosure. In FIG. 9A, a plurality of wireless nodes in a serving cell may agree in advance that a primary channel is on sub-band 1 902 among sub-band 0 900, sub-band 1 902, sub-band 2 904, and sub-band 3 906 in this serving cell. A base station may perform CCA on sub-band 1 902 to see whether sub-band 1 902 is available for transmissions. After determining sub-band 1 is available, the base station may perform CCA 910 on sub-band 0 900, sub-band 2 904, and sub-band 3 906 to see if they are also available for transmissions. However, if sub-band 1 902 is not available, the base station may not perform CCA 910 on other sub-bands but wait for a next TxOP. The results of CCA 908 and 910 on sub-band 0 900, sub-band 1 902, sub-band 2 904, and sub-band 3 906 may indicate the occupancy status of all these sub-bands. Accordingly, the base station may transmit CR signal 921 including such occupancy information on sub-band 1 902. After transmitting CR signal 921, the base station may transmit regular control information or data traffic 920 and 922 on sub-band 1 902 and sub-band 3 906 that have passed CCA. Optionally, the base station may transmit CR signal 923 on sub-band 3 906. Correspondingly, a UE may receive CR signal 921 (not shown in FIG. 9A) on sub-band 1 902 and optional CR signal 923 on sub-band 3 906 to determine the occupancy status of sub-band 0 900, sub-band 1 902, sub-band 2 904, and sub-band 3 906 in the serving cell. A desirable UE may utilize sub-band 1 902 and sub-band 3 906 that are indicated available by CR signal 921. An aggressor UE may yield to the desirable user or avoid using sub-band 1 902 and sub-band 3 906.

In operation at NR networks, a primary channel may be agreed upon by all the NR nodes in a serving cell. Since a CR signal is transmitted on the primary channel, the primary channel may be monitored continuously and closely. In contrast, for other sub-bands, CCA may be simpler and abbreviated.

CCA may be performed by different mechanism. Among NR nodes, preamble/packet detection (PD) may be used for CCA. However, among NR nodes and other incumbent users utilizing different RATs, such as WiFi nodes, LAA nodes, eLAA nodes, or MF nodes, energy detection (ED) may be needed as preamble/packet transmissions by NR nodes may not be understood by incumbent users, and vice versa. Accordingly, PD and ED may be both used for CCA on a primary channel, and ED may be used for abbreviated CCA on other sub-bands. For example, in FIG. 9A, CCA 908 by PD and ED may be performed on sub-band 1 902, and then CCA 910 by ED may be performed on sub-band 0 900, sub-band 2 904, and sub-band 3 906. In some cases, CCA 908 on sub-band 1 902 may be prolonged and continue in time slot 924, during which CCA 910 by ED is performed. As a further example, in FIG. 9A, PD and ED may be also used for CCA 910 on sub-band 0 900, sub-band 2 904, and sub-band 3 906. In addition to PD and ED, features detection for a specific RAT may be also used in CCA 908 or CCA 910.

A CR signal may include a preamble and a CR-DCI. For example, in FIG. 9A, CR signal 921 may include preamble 912 and CR-DCI 916 and CR signal 923 may include preamble 914 and CR-DCI 918. CR-DCI 916 or 918 may carry information regarding the occupancy status of sub-band 0 900, sub-band 1 902, sub-band 2 904, and sub-band 3 906. In some cases, CR-DCI 916 or 918 may include a bitmap that indicates the occupancy status of sub-band 0 900, sub-band 1 902, sub-band 2 904, and sub-band 3 906. Preamble 912 and 914 may be transmitted after sub-band 1 902 and sub-band 3 906 are determined clear and followed by CR-DCI 916 and 918, respectively. Correspondingly, a UE may receive and process CR-DCI 916 transmitted on sub-band 1 902 (primary channel) and optional CR-DCI 918 transmitted on sub-band 3 906 to obtain the occupancy status of sub-band 0 900, sub-band 1 902, sub-band 2 904, and sub-band 3 906.

NR nodes in a serving cell may be synchronized or non-synchronized. When NR nodes in the serving cell are not synchronized, preamble 912 may be used to synchronize the NR nodes. On the other hand, when NR nodes in the serving cell are synchronized, preamble 912 may be used to enable energy detection by a different RAT user, such as a WiFi node, an LAA node, an eLAA node, or a MF node. In other words, preamble 912 may be transmitted to hold a channel until the start of transmission of CR-DCI 916. If preamble 912 is not transmitted, the different RAT user may misunderstand that sub-band 1 902 is available for its transmission.

Figure 9B:

FIG. 9B are block diagrams illustrating details regarding sub-band based LBT using a primary channel according to further aspect of the present disclosure. In FIG. 9B, CR-DCI, such as CD-DCI 916, 918, 926, 928, 930, and 932, may be scheduled to be transmitted and re-transmitted periodically based on a pre-configured timeline among synchronized NR nodes. Correspondingly, a UE, either a desirable UE or an aggressor UE, may periodically monitor such CR-DCI to mitigate interference.

FIG. 10 is a functional block diagram illustrating exemplary blocks executed to implement sub-band based LBT to support activation of multiple BWPs for downlink and uplink according to one aspect of the present disclosure. The example blocks may be implemented by a base station, such as base station 105 or base station 1300 in FIGS. 1, 2, 3, and 13. For NR networks, the base station may be a serving gNB. At block 1000, a base station may determine that a clear channel assessment (CCA) on multiple sub-bands among a plurality of sub-bands is clear for a plurality of wireless nodes in a serving cell. At block 1002, the base station may transmit a channel reservation (CR) signal on each of the multiple sub-bands that are determined clear. The CR signal may indicate an occupancy status of the plurality of sub-bands. The sub-band based LBT is a hand-shaking procedure per sub-band. It may occur before multiple sub-bands in multiple BWPs for downlink and uplink are activated at a later point of time for transmission.

FIG. 11 is a functional block diagram illustrating exemplary blocks executed to implement sub-band based LBT to support activation of multiple BWPs for downlink and uplink according to another aspect of the present disclosure. The example blocks may be implemented by a UE, such as UE 115 or UE 1400 in FIGS. 1, 2, 3, and 14. For NR networks, the UE may be a desirable user or an aggressor. At block 1100, a UE may monitor a plurality of sub-bands for a plurality of wireless nodes in a serving cell. At block 1102, the UE may receive a channel reservation (CR) signal on each of multiple sub-bands of the plurality of sub-bands that have a clear clear channel assessment (CCA). The CR signal may indicate an occupancy status of the plurality of sub-bands. The sub-band based LBT illustrated in FIGS. 10 and 11, unlike the sub-band LBT illustrated in FIGS. 7-9, does not utilize any primary channel. Therefore, it may utilize frequency spectrum more efficiently as accessibility of a plurality of sub-bands would not be restricted by the accessibility of a primary channel.

Figure 12A:
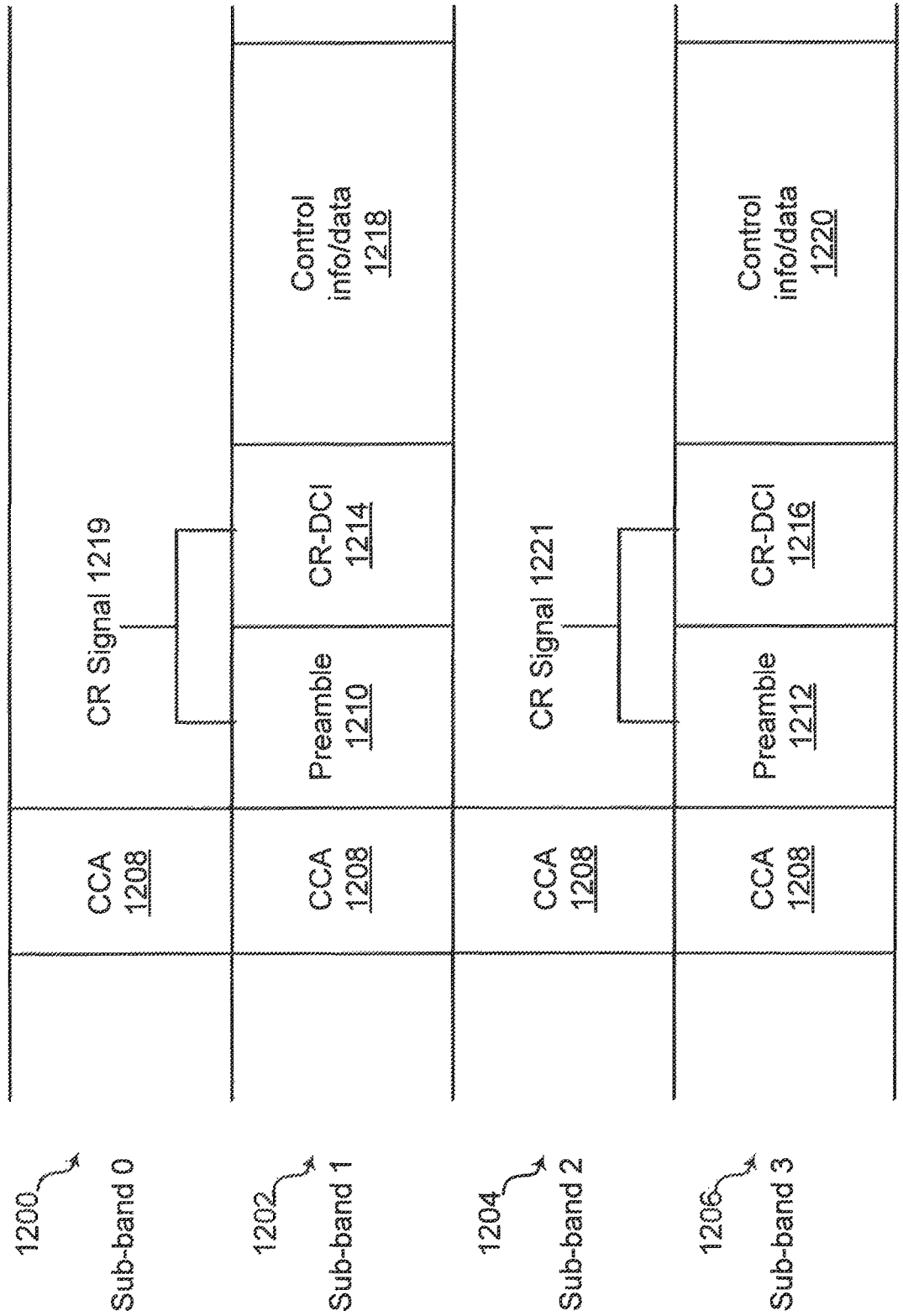

FIG. 12A are block diagrams illustrating details regarding sub-band based LBT according to one aspect of the present disclosure. In FIG. 12A, a base station may perform CCA 1208 on each of sub-band 0 1200, sub-band 1 1202, sub-band 2 1204, and sub-band 3 1206 to see if they are available for transmission. After determining sub-band 1 1202 and sub-band 3 1206 are clear, the base station may transmit CR signal 1219 on sub-band 1 1202 and CR signal 1221 on sub-band 3 1206, respectively. The base station may not transmit any CR signal on sub-band 0 1200 and sub-band 2 1204 that do not pass CCA. After transmitting CR signal 1219 and 1221, the base station may transmit regular control information or data traffic 1218 and 1220 on sub-band 1 1202 and sub-band 3 1206, respectively. Correspondingly, a UE may receive CR signal 1219 on sub-band 1 1202 and CR signal 1221 on sub-band 3 1206 to determine the occupancy status of sub-band 0 1200, sub-band 1 1202, sub-band 2 1204, and sub-band 3 1206 in the serving cell. A desirable UE may utilize sub-band 1 1202 and sub-band 3 1206 that are indicated available by CR signal 1219 or 1221. An aggressor UE may yield to the desirable user or avoid using sub-band 1 1202 and sub-band 3 1206.

CR signal 1219 may include preamble 1210 and CR-DCI 1214 and CR signal 1221 may include preamble 1212 and CR-DCI 1216. CR-DCI 1214 or 1216 may carry information regarding the occupancy status of sub-band 0 1200, sub-band 1 1202, sub-band 2 1204, and sub-band 3 1206. In some cases, CR-DCI 1214 or 1216 may include a bitmap that indicates the occupancy status of sub-band 0 1200, sub-band 1 1202, sub-band 2 1204, and sub-band 3 1206. Preamble 1210 and 1212 may be transmitted after sub-band 1 1202 and sub-band 3 1206 are determined clear and followed by CR-DCI 1214 or 1216, respectively. Correspondingly, a UE may receive and process CR-DCI 1214 transmitted on sub-band 1 1202 or CR-DCI 1216 transmitted on sub-band 3 1206 to obtain the occupancy status of sub-band 0 1200, sub-band 1 1202, sub-band 2 1204, and sub-band 3 1206.

NR nodes in a serving cell may be synchronized or non-synchronized. When NR nodes in the serving cell are not synchronized, preamble 1210 and 1212 may be used to synchronize the NR nodes. On the other hand, when NR nodes in the serving cell are synchronized, preamble 1210 and 1212 may be used to enable energy detection by a different RAT user, such as a WiFi node, an LAA node, an eLAA node, or a MF node. In other words, preamble 1210 and 1212 may be transmitted to hold a channel until the start of transmission of CR-DCI 1214 and 1216, respectively. If preamble 1210 or 1212 is not transmitted, the different RAT user may misunderstand that sub-band 1 1202 or sub-band 3 1206 is available for its transmission.

FIG. 12B are block diagrams illustrating details regarding sub-band based LBT according to further aspect of the present disclosure. In FIG. 12B, CR-DCI, such as CD-DCI 1214, 1216, 1222, 1224, 1226, and 1228, may be scheduled to be transmitted and re-transmitted periodically based on a pre-configured timeline among synchronized NR nodes. Correspondingly, a UE, either a desirable UE or an aggressor UE, may periodically monitor such CR-DCI to mitigate interference.

Figure 13:
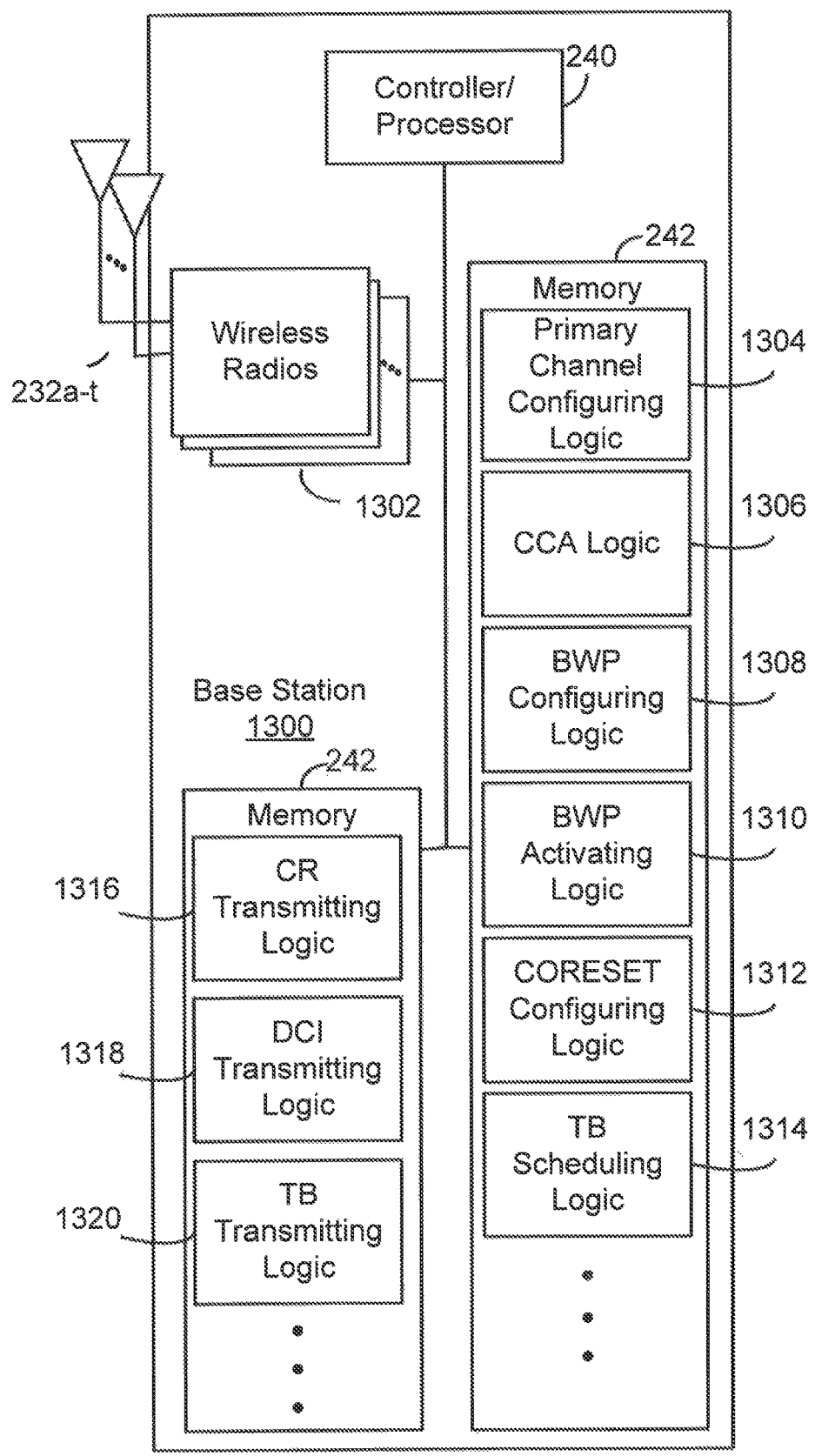
FIG. 13 is a block diagram of base station in a communication network according to one aspect of the present disclosure.

FIG. 13 is a block diagram of base station 1300 in a communication network according to one aspect of the present disclosure. Base station 1300 may have the same or similar configuration as the configuration of base station 105 in FIGS. 1, 2, and 3. Base station 1300 may include controller/processor 240 to perform or direct the execution of various processes or program codes stored in memory 242. Base station 1300 may further include wireless radios 1302 to process uplink or downlink signals received from antennas 234*a-t*. Memory 242 may store program codes for execution of primary channel configuring logic 1304, CCA logic 1306, BWP configuring logic 1308, BWP activating logic 1310, CORESET configuring logic 1312, and TB scheduling logic 1314. Memory 242 may further store program codes for execution of CR transmitting logic 1316, DCI transmitting logic 1318, and TB transmitting logic 1320.

Primary channel configuring logic 1304, CCA logic 1306, and CR transmitting logic 1316 may be used to perform sub-band based LBT, such as sub-band based CCA, to support multiple BWPs for downlink and uplink on multiple sub-bands to be activated at a later point of time. Primary channel configuring logic 1304 may be used to configure a primary channel for a plurality of wireless nodes in a serving cell on a first sub-band among a plurality of sub-bands. CCA logic 1306 may be used to determine a CCA on the primary channel is clear, and then the CCA on one or more other sub-bands of the plurality of sub-bands is also clear after the CCA on the primary channel is determined clear. CR transmitting logic may be used to transmit a CR signal on the primary channel with a clear CCA, the CR signal indicating an occupancy status of the plurality of sub-bands. In some cases, CCA logic 1306 may be used to determine a CCA on multiple sub-bands of the plurality of sub-bands directly without accessing any primary channel first.

BWP configuring logic 1308, BWP activating logic 1310, and DCI transmitting logic 1318 may be used to activate multiple BWPs for downlink and uplink. BWP configuring logic 1308 may be used to configure a plurality of BWPs. BWP activating logic 1310 may be used to activate multiple BWPs for downlink and multiple BWPs for uplink from the plurality of the configured BWPs at a given time. DCI transmitting logic 1318 may be used to transmit DCI on a PDCCH that includes BWP activation information for one or more of the multiple BWPs for downlink and the multiple BWPs for uplink.

Additionally. CORESET configuring logic 1312 may be a used to configure a CORESET for DCI of a PDCCH for the activation of multiple BWPs for downlink and uplink. Further, TB scheduling logic 1314 may be used to schedule a TB on a PDSCH over a single sub-band in one of the multiple activated BWPs for downlink or multiple sub-bands in one or more of the multiple activated BWPs for downlink.

Figure 14:
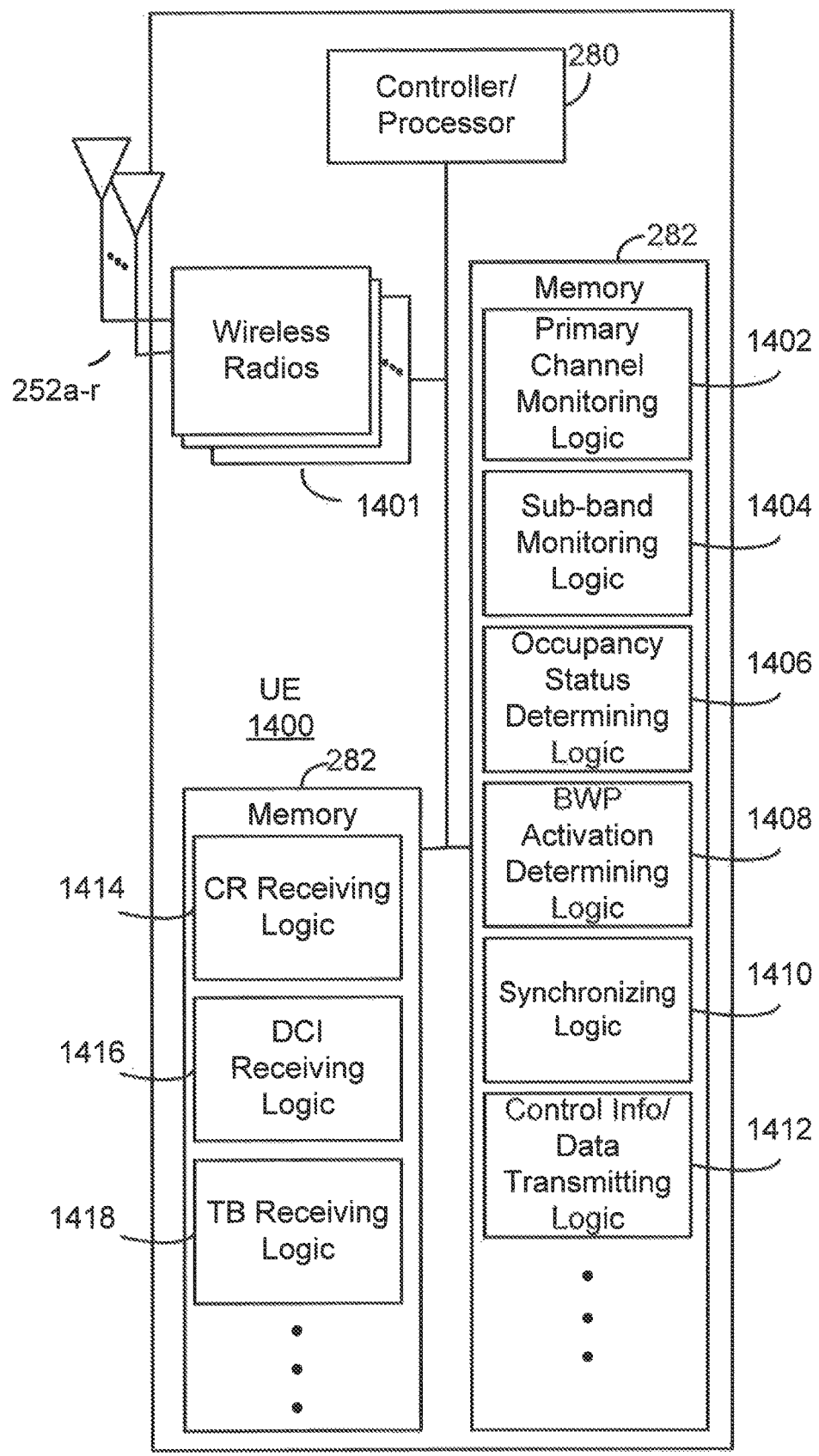
FIG. 14 is a block diagram of UE in a communication network according to one aspect of the present disclosure.

FIG. 14 is a block diagram of UE 1400 in a communication network according to one aspect of the present disclosure. UE 1400 may have the same or similar configuration as the configuration of UE 115 in FIGS. 1, 2, and 3. UE 1400 may include controller/processor 280 to perform or direct the execution of various processes or program codes stored in memory 282. UE 1400 may further include wireless radios 1401 to process uplink or downlink signals received from antennas 252*a-r*. Memory 282 may store program codes for execution of primary channel monitoring logic 1402, sub-band monitoring logic 1404, occupancy status determining logic 1406, BWP activation determining logic 1408, synchronizing logic 1410, control information/data transmitting logic 1412. Memory 282 may further store program codes for execution of CR receiving logic 1414, DCI receiving logic 1416, and TB receiving logic 1418.

Primary channel monitoring logic 1402, sub-band monitoring logic 1404, occupancy status determining logic 1406, and CR receiving logic 1414 may be used in sub-band based LBT procedure, such as sub-band based CCA, to support multiple BWPs for downlink and uplink on multiple sub-bands to be activated at a later point of time. Primary channel monitoring logic 1402 may be used to monitor a primary channel for a plurality of wireless nodes in a serving cell on a first sub-band among a plurality of sub-bands. Alternatively or additionally, sub-band monitoring logic 1404 may be used to monitor a plurality of sub-bands for a plurality of wireless nodes in a serving cell. CR receiving logic 1414 may be used to receive a CR signal on each of multiple sub-bands of the plurality of sub-bands that have a clear CCA or on the primary channel that have a clear CCA. Occupancy status determining logic 1406 may be used to determine the occupancy status of the plurality of sub-bands based on the received CR signal. Additionally. Synchronizing logic 1410 may be used to perform synchronization within the serving cell based on the received preamble in the CR signal.

BWP activation determining logic 1408 and DCI receiving logic 1416 may be used in activation of multiple BWPs for downlink and uplink. DCI receiving logic 1416 may be used to receive DCI on a PDCCH that includes BWP activation information. BWP activation determining logic 1408 may be used to determine activation of multiple BWPs for downlink and multiple BWPs for uplink at a given time based on the received DCI and UE capabilities.

Additionally, control information/data transmitting logic 1412 may be used to transmit control information/data traffic on the multiple activated BWPs for uplink. Also, TB receiving logic 1418 may be used to receive one or more TBs. A TB transmitted on a PDSCH is scheduled over a single sub-band in one of the multiple BWPs for or multiple sub-bands over one or more of the multiple BWPs for downlink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4, 5, 7, 8, 10, and 11 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
generating bandwidth part (BWP) activation information for multiple BWPs for downlink and for multiple BWPs for uplink, wherein the BWP activation information includes a schedule of the multiple BWPs for downlink and the multiple BWPs for uplink; and
transmitting downlink control information (DCI) that includes the BWP activation information on a physical downlink control channel (PDCCH), wherein the DCI is configured to be fully contained in a single sub-band.

2. The method of claim 1, wherein the BWP activation information includes a link direction of one or more of the multiple BWPs for downlink and the multiple BWPs for uplink.

3. The method of claim 2, wherein the BWP activation information includes one or more of: a frequency location, a bandwidth, subcarrier spacing, a cyclic prefix length, reserved sub-band information, or tracking reference signal (TRS) configuration.

4. The method of claim 1, further including configuring a control channel resource set (CORESET) for the DCI.

5. The method of claim 1, wherein a BWP is on one or more sub-bands.

6. The method of claim 5, wherein the DCI includes a resource block (RB) index and a sub-band index to indicate locations of resources.

7. The method of claim 1, further including scheduling a single transport block (TB) on a physical downlink shared channel (PDSCH) over:
the single sub-band in one of the multiple BWPs for downlink; or
multiple sub-bands in one or more of the multiple BWPs for downlink.

8. The method of claim 7, wherein the scheduling includes performing a frequency first mapping.

9. The method of claim 7, wherein a modulation and coding scheme (MCS) of the single TB is different from a MCS of another TB when the single TB is scheduled on the single sub-band.

10. The method of claim 7, wherein the scheduling the single TB on the multiple sub-bands includes scheduling different code block groups (CBGs) of the single TB on different sub-bands, wherein different CBGs have different modulation and coding schemes (MCSs).

11. A method of wireless communication, comprising:
receiving downlink control information (DCI) that includes bandwidth part (BWP) activation information for multiple BWPs for downlink and for multiple BWPs for uplink on a physical downlink control channel (PDCCH), wherein the DCI is configured to be fully contained in a single sub-band, and wherein the BWP activation information includes a schedule of the multiple BWPs for downlink and the multiple BWPs for uplink; and
performing at least one of: monitoring the multiple BWPs for downlink for control information and data traffic, or transmitting control information and data traffic on the multiple BWPs for uplink.

12. The method of claim 11, wherein the BWP activation information includes a link direction of one or more of the multiple BWPs for downlink and the multiple BWPs for uplink.

13. The method of claim 12, wherein the BWP activation information includes one or more of: a frequency location, a bandwidth, subcarrier spacing, a cyclic prefix length, reserved sub-band information, or tracking reference signal (TRS) configuration.

14. The method of claim 11, wherein a BWP is on one or more sub-bands.

15. The method of claim 14, wherein the DCI includes a resource block (RB) index and a sub-band index to indicate locations of resources.

16. The method of claim 11, further including receiving a single transport block (TB) on a physical downlink shared channel (PDSCH) scheduled over:
the single sub-band in one of the multiple BWPs for downlink; or
multiple sub-bands over one or more of the multiple BWPs for downlink.

17. The method of claim 16, wherein a modulation and coding scheme (MCS) of the single TB is different from a MCS of another TB when the single TB is scheduled on the single sub-band.

18. The method of claim 16, further including receiving different code block groups (CBGs) of the single TB on the multiple sub-bands, wherein different CBGs have different modulation and coding schemes (MCSs).

19. An apparatus configured for wireless communication, the apparatus comprising:
- at least one processor; and
- a memory coupled to the at least one processor,
- wherein the at least one processor is configured:
  - to generate bandwidth part (BWP) activation information for multiple BWPs for downlink and for multiple BWPs for uplink, wherein the BWP activation information includes a schedule of the multiple BWPs for downlink and the multiple BWPs for uplink; and
  - to transmit downlink control information (DCI) that includes the BWP activation information on a physical downlink control channel (PDCCH), wherein the DCI is configured to be fully contained in a single sub-band.

20. The apparatus of claim 19, wherein the at least one processor is further configured to configure a control channel resource set (CORESET) for the DCI.

21. An apparatus configured for wireless communication, the apparatus comprising:
- at least one processor; and
- a memory coupled to the at least one processor,
- wherein the at least one processor is configured:
  - to receive downlink control information (DCI) that includes bandwidth part (BWP) activation information for activation of multiple BWPs for downlink and multiple BWPs for uplink on a physical downlink control channel (PDCCH), wherein the DCI is configured to be fully contained in a single sub-band, and wherein the BWP activation information includes a schedule of the multiple BWPs for downlink and the multiple BWPs for uplink; and
  - to perform at least one of: monitoring the multiple BWPs for downlink for control information and data traffic, or transmitting control information and data traffic on the multiple BWPs for uplink.

22. The apparatus of claim 21, wherein the at least one processor is further configured to process the DCI contained in the single sub-band, wherein a BWP is on one or more sub-bands, wherein the DCI further includes a resource block (RB) index and a sub-band index to indicate locations of resources.

23. The apparatus of claim 21, wherein a BWP is on one or more sub-bands.

24. The method of claim 1, further comprising configuring the plurality of BWPs.

25. The method of claim 1, wherein the generated BWP activation information for the multiple BWPs for downlink and for the multiple BWPs for uplink is generated at a same time.

26. The apparatus of claim 19, wherein the at least one processor is configured to configure the plurality of BWPs.

27. The apparatus of claim 19, wherein the generated BWP activation information for the multiple BWPs for downlink and for the multiple BWPs for uplink is generated at a same time.

28. The apparatus of claim 19, wherein a BWP is on one or more sub-bands.

* * * * *